(12) United States Patent
Oikawa

(10) Patent No.: US 12,405,495 B2
(45) Date of Patent: Sep. 2, 2025

(54) ELECTRO-OPTICAL DEVICE AND ELECTRONIC APPARATUS

(71) Applicant: SEIKO EPSON CORPORATION, Tokyo (JP)

(72) Inventor: Hiroyuki Oikawa, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/603,241

(22) Filed: Mar. 13, 2024

(65) Prior Publication Data

US 2024/0310671 A1    Sep. 19, 2024

(30) Foreign Application Priority Data

Mar. 14, 2023  (JP) .................. 2023-039389

(51) Int. Cl.
   *G02F 1/1335*  (2006.01)
   *G02F 1/1345*  (2006.01)

(52) U.S. Cl.
   CPC .. *G02F 1/133512* (2013.01); *G02F 1/133553* (2013.01); *G02F 1/13452* (2013.01)

(58) Field of Classification Search
   CPC ......... G02F 1/133512; G02F 1/133553; G02F 1/13452
   USPC ........................................................ 349/110
   See application file for complete search history.

(56) References Cited

U.S. PATENT DOCUMENTS

2016/0077376 A1* 3/2016 Lee .................. G02F 1/133512
                                                   349/110
2021/0389634 A1* 12/2021 Ito ..................... G02F 1/136209

FOREIGN PATENT DOCUMENTS

JP          2017083678         5/2017

* cited by examiner

*Primary Examiner* — Michael H Caley
*Assistant Examiner* — David Y Chung
(74) *Attorney, Agent, or Firm* — JCIPRNET

(57) ABSTRACT

An electro-optical device includes a display area configured to display an image and a peripheral area provided outside the display area in plan view. The electro-optical device includes a first substrate, a second substrate facing the first substrate, and an electro-optical layer disposed between the first substrate and the second substrate and having an optical characteristic changing in accordance with an electric field. One or both of the first substrate and the second substrate include a light blocking layer provided in the peripheral area and a reflection layer provided in the peripheral area. A reflectance of the reflection layer with respect to visible light is higher than a reflectance of the light blocking layer with respect to visible light. The light blocking layer is disposed closer to the display area than the reflection layer is to the display area.

11 Claims, 11 Drawing Sheets

ELECTRO-OPTICAL DEVICE AND ELECTRONIC APPARATUS

The present application is based on, and claims priority from JP Application Ser. No. 2023-039389, filed Mar. 14, 2023, the disclosure of which is hereby incorporated by reference herein in its entirety.

BACKGROUND

1. Technical Field

The present disclosure relates to an electro-optical device and an electronic apparatus.

2. Related Art

For example, an electro-optical device such as a liquid crystal display device in which optical characteristics can be changed for each pixel is used for an electronic apparatus such as a projector. As an example of the electro-optical device, an electro-optical device described in JP-A-2017-083678 has been known.

The electro-optical device disclosed in JP-A-2017-083678 includes a first substrate, a second substrate, and a liquid crystal layer disposed between the substrates. The electro-optical device is provided with a display area and a peripheral area surrounding the display area. Moreover, transistors and pixel electrodes are provided in the display area of the first substrate. A facing electrode is provided in the display area of the second substrate.

Further, a conductive film is provided in the peripheral area of the first substrate. The conductive film has a light blocking property and is provided to prevent light leakage in the peripheral area. The conductive film is composed of a layered body of an aluminum film and a titanium nitride film having a light absorbing property. A partition portion is also provided in the peripheral area of the second substrate. In a manner similar to the first substrate, the partition portion prevents light leakage in the peripheral area.

Since the conductor and the partition portion are provided, light leakage in the peripheral area is suppressed. However, since the conductor and the partition portion absorb light, the temperatures of the first substrate and the second substrate rise. Thus, it is difficult to suppress the temperature rise while suppressing the light leakage. As a result, the quality reliability of the electro-optical device may be degraded.

SUMMARY

An electro-optical device according to an aspect of the present disclosure is an electro-optical device including a display area configured to display an image and a peripheral area provided outside the display area in plan view, wherein the electro-optical device includes a first substrate, a second substrate facing the first substrate, and an electro-optical layer disposed between the first substrate and the second substrate and having an optical characteristic changing in accordance with an electric field, one or both of the first substrate and the second substrate include a light blocking layer provided in the peripheral area and a reflection layer provided in the peripheral area, a reflectance of the reflection layer with respect to visible light is higher than a reflectance of the light blocking layer with respect to visible light, and the light blocking layer is disposed closer to the display area than the reflection layer is to the display area.

DESCRIPTION OF EMBODIMENTS

Figure 1:
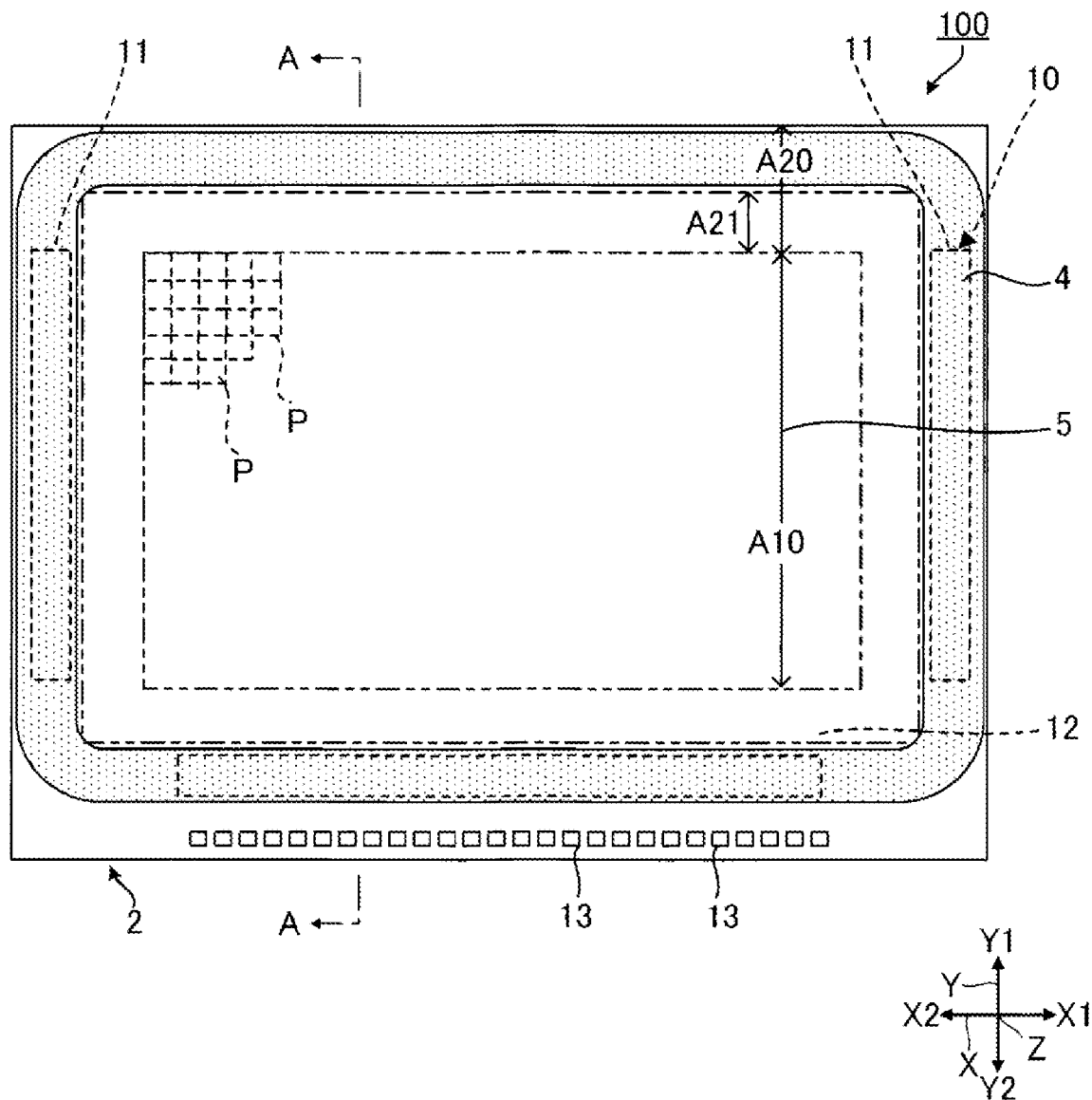
FIG. 1 is a plan view of an electro-optical device according to an embodiment.

A preferred embodiment according to the present disclosure will be described below with reference to the attached drawings. Note that, in the drawings, the dimension or scale of each part may differ from the actual one as appropriate, and some parts are schematically illustrated for ease of understanding. Further, the scope of the present disclosure is not limited to these forms, unless there is a particular description for limiting the present disclosure in the following.

A. Electro-optical Device 100

A-1 Summary of Electro-optical Device 100

Figure 2:
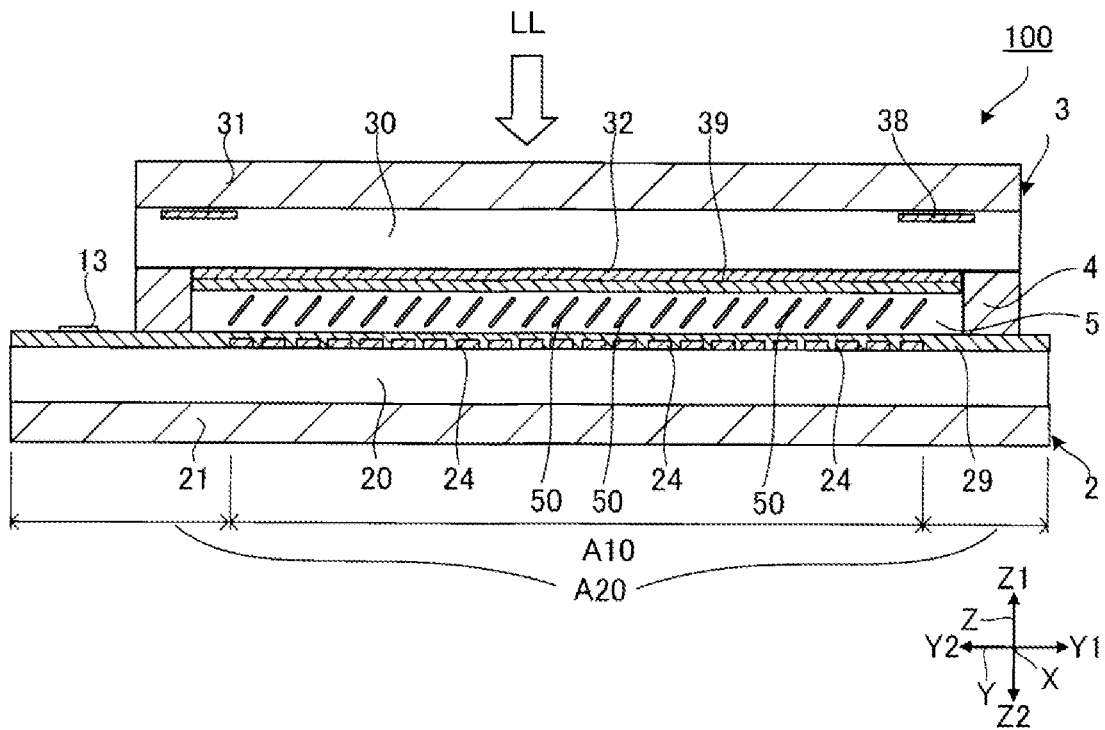
FIG. 2 is a cross-sectional view of the electro-optical device illustrated in FIG. 1 taken along line A-A.

FIG. 1 is a plan view of an electro-optical device 100 according to an embodiment. FIG. 2 is a cross-sectional view of the electro-optical device 100 illustrated in FIG. 1 taken along line A-A. An X-axis, a Y-axis, and a Z-axis that are orthogonal to one another are used below as appropriate for convenience of description. Further, one direction along the X-axis is denoted as an X1 direction, and the direction opposite to the X1 direction is denoted as an X2 direction. Likewise, one direction along the Y-axis is denoted as a Y1 direction, and the direction opposite to the Y1 direction is denoted as a Y2 direction. One direction along the Z-axis is denoted as a Z1 direction, and the direction opposite to the 21 direction is denoted as a 22 direction.

Further, "electrical coupling" between an element x and an element ß in the present specification includes not only a configuration where the element α and the element β conduct by being directly joined to each other, but also a configuration where the element α and the element β indirectly conduct through another conductor.

The electro-optical device 100 illustrated FIGS. 1 and 2 is an active matrix driving liquid crystal device including a thin film transistor (TFT) as a switching element for each pixel.

The electro-optical device 100 includes a first substrate 2, a second substrate 3, a seal member 4 having a frame shape, and a liquid crystal layer 5. As illustrated in FIG. 2, the first substrate 2, the liquid crystal layer 5, and the second substrate 3 are arrayed in the Z1 direction in the stated order. Note that viewing from the Z1 direction or the Z2 direction, which is a direction in which the first substrate 2, the liquid crystal layer 5, and the second substrate 3 overlap with one another, is referred to as "plan view". Further, the plane shape of the electro-optical device 100 illustrated in FIG. 1 is a rectangular shape, but may be a polygonal shape other than a rectangular shape or a circular shape.

The electro-optical device 100 is of a transmission type, and the first substrate 2 and the second substrate 3 have a transmissive property. As illustrated in FIG. 2, for example, light LL is incident on the second substrate 3 and then is emitted from the first substrate 2. During this, the incident light LL is modulated to display an image. Further, the "transmissive property" indicates transparency with respect to visible light, and may indicate a transmittance of visible light of 50% or greater.

As illustrated in FIG. 1, the electro-optical device 100 includes a display area A10 and a peripheral area A20. The display area A10 is an area for displaying an image and is provided with a plurality of pixels P disposed in a matrix. The peripheral area A20 is located outside the display area A10 and surrounds the display area A10 in plan view. Moreover, the peripheral area A20 includes a dummy pixel area A21. The dummy pixel area A21 surrounds the display area A10 in plan view.

As illustrated in FIG. 2, the first substrate 2 includes a substrate 21, a layered body 20, a plurality of pixel electrodes 24, a plurality of dummy pixel electrodes 24d, and an alignment film 29. The substrate 21, the layered body 20, the plurality of pixel electrodes 24, and the alignment film 29 are layered in the Z1 direction in the stated order.

The substrate 21 is a flat plate having a transmissive property and an insulating property, and is composed of a glass substrate or a quarts substrate, for example. The layered body 20 has a transmissive property. The layered body 20 is provided with transistors, various wiring lines, and the like. The plurality of pixel electrodes 24 and the plurality of dummy pixel electrodes 24d are disposed at the layered body 20. One of the pixel electrodes 24 is provided for each pixel P. The plurality of pixel electrodes 24 are used to apply an electric field to the liquid crystal layer 5. The plurality of dummy pixel electrodes 24d do not contribute to display but are drive-controlled in a manner similar to the plurality of pixel electrodes 24. For example, the plurality of dummy pixel electrodes 24d are used as a measure against noise of image signals written in the plurality of pixel electrodes 24. Each of the plurality of pixel electrodes 24 and the plurality of dummy pixel electrodes 24d includes a transparent conductive material such as indium tin oxide (ITO), indium zinc oxide (IZO), and fluorine-doped tin oxide (FTO). Note that an electrode for ion trapping may be provided outside the plurality of pixel electrodes 24.

The alignment film 29 has a transmissive property and an insulating property. The alignment film 29 is in contact with the liquid crystal layer 5 and aligns liquid crystal molecules 50 included in the liquid crystal layer 5. The alignment film 29 is disposed to cover the plurality of pixel electrodes 24. Examples of the material of the alignment film 29 include polyimide and silicon oxide.

Further, as illustrated in FIG. 1, a driving circuit 10 and a plurality of external terminals 13 are disposed at the first substrate 2. The driving circuit 10 includes a scanning line drive circuit 11 and a data line drive circuit 12. Although not illustrated, some of the plurality of external terminals 13 are coupled to wiring lines drawn from the driving circuit 10. Further, the plurality of external terminals 13 include an external terminal 13 to which a constant potential Vcom is applied.

The second substrate 3 illustrated in FIG. 2 is disposed to face the first substrate 2. The second substrate 3 includes a substrate 31, a layered body 30, a facing electrode 32, an alignment film 39, and a partition portion 38. The substrate 31, the layered body 30, the facing electrode 32, and the alignment film 39 are layered in the Z2 direction in the stated order.

The substrate 31 is a flat plate having a transmissive property and an insulating property and is composed of a glass substrate or a quarts substrate, for example. The layered body 30 includes a plurality of insulating films. Each of the plurality of insulating films has a transmissive property and an insulating property and is made of an inorganic material including silicon such as silicon oxide. The layered body 30 includes, for example, a microlens. The layered body 30 is also provided with the partition portion 38. The partition portion 38 is provided to block unnecessary stray light from being incident on the display area A10.

The facing electrode 32 faces the plurality of pixel electrodes 24 via the liquid crystal layer 5. The facing electrode 32 is used to apply an electric field to the liquid crystal layer 5. The facing electrode 32 is a common electrode commonly provided for the plurality of pixels P. The facing electrode 32 has a transmissive property and conductivity. The facing electrode 32 includes a transparent conductive material such as ITO, IZO, and FTO. The alignment film 39 has a transmissive property and an insulating property. The alignment film 39 aligns the liquid crystal molecules 50. Examples of the material of the alignment film 39 include polyimide and silicon oxide.

Further, a conductive material (not illustrated) is disposed between the second substrate 3 and the first substrate 2. The conductive material electrically couples the first substrate 2 and the second substrate 3. This conductive material is coupled to any external terminal 13 of the plurality of external terminals 13 via a wiring line (not illustrated). Thus, the constant potential Vcom is applied to the facing electrode 32 via the wiring line and the conductive material.

The seal member 4 is disposed between the first substrate 2 and the second substrate 3. The seal member 4 includes a UV-curable material such as an epoxy resin. UV is an abbreviation for ultraviolet, and particularly indicates light having a wavelength from 100 nm to 400 nm. Further, the seal member 4 may include a gap material composed of an inorganic material such as glass.

The liquid crystal layer 5 is disposed between the first substrate 2 and the second substrate 3. Specifically, the liquid crystal layer 5 is disposed in an area surrounded by the first substrate 2, the second substrate 3, and the seal member 4. The liquid crystal layer 5 is an electro-optical layer having optical characteristics that change in accordance with an electric field. The liquid crystal layer 5 includes the liquid crystal molecules 50. The liquid crystal molecules 50 have positive or negative dielectric anisotropy. Alignment of the liquid crystal molecules 50 changes in accordance with a voltage applied to the liquid crystal layer 5.

For example, the electro-optical device 100 described herein is applied to display devices that perform color display such as a personal computer and a smartphone, which are described below. When the electro-optical device 100 is applied to these display devices, a color filter is used for the electro-optical device 100 as appropriate. Further, the electro-optical device 100 is applied to, for example, a projection-type projector described below. In this case, the electro-optical device 100 functions as a light valve. In this case, the color filter is omitted for the electro-optical device 100.

A-2. Electrical Configuration of First Substrate 2

Figure 3:
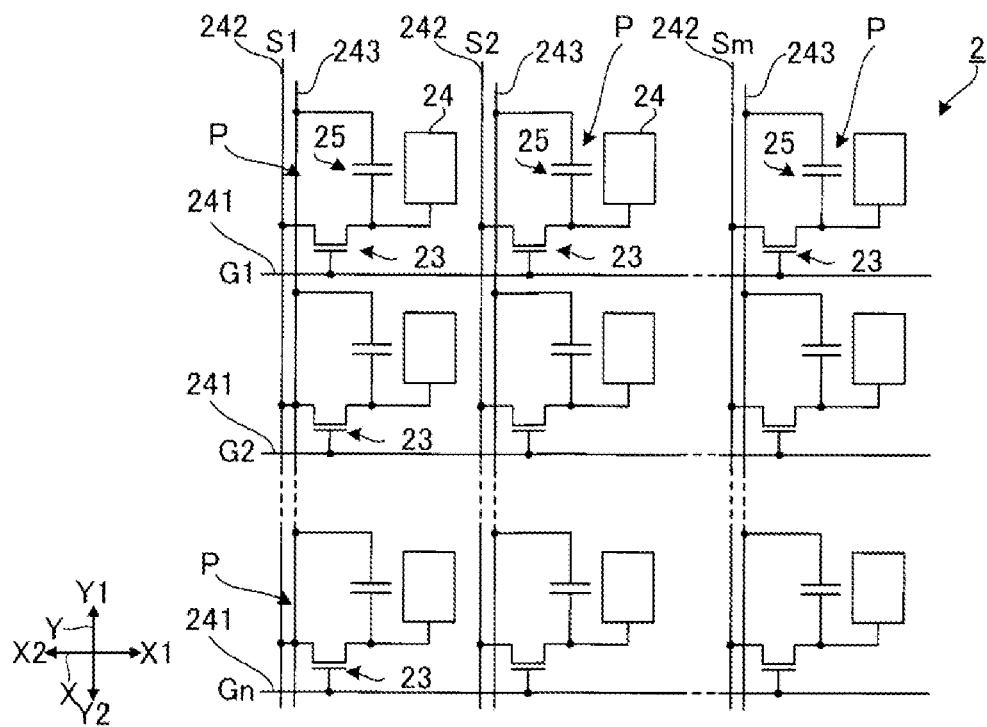
FIG. 3 is an equivalent circuit diagram illustrating an electrical configuration of a first substrate in FIG. 1.

FIG. 3 is an equivalent circuit diagram illustrating an electrical configuration of the first substrate 2 in FIG. 1. As illustrated in FIG. 3, the first substrate 2 is provided with a plurality of transistors 23, n scanning lines 241, m data lines 242, and m constant potential lines 243. Those are provided at the layered body 20 in FIG. 2. Note that each of n and m is an integer equal to or greater than 2. One of the transistors 23 is disposed corresponding to each intersection of the n scanning lines 241 and the m data lines 242. Each of the transistors 23 is a TFT that functions as a switching element, for example. Each of the transistors 23 includes a gate, a source, and a drain.

Each of the n scanning lines 241 extends in the X1 direction, and the n scanning lines 241 are arrayed at an equal interval in the Y1 direction. Each of the n scanning lines 241 is electrically coupled to the gates of a plurality of corresponding transistors 23. The n scanning lines 241 are electrically coupled to the scanning line drive circuit 11 illustrated in FIG. 1. Scanning signals G1, G2, . . . , and Gn are line-sequentially supplied to the first to n-th scanning lines 241 from the scanning line drive circuit 11.

Each of the m data lines 242 illustrated in FIG. 3 extends in the Y1 direction, and the m data lines 242 are arrayed at an equal interval in the X1 direction. Each of the m data lines 242 is electrically coupled to the sources of a plurality of corresponding transistors 23. The m data lines 242 are electrically coupled to the data line drive circuit 12 illustrated in FIG. 1. Image signals S1, S2, . . . , and Sm are supplied in parallel from the data line drive circuit 12 to the first to m-th data lines 242.

The n scanning lines 241 and the m data lines 242 illustrated in FIG. 3 are electrically insulated from each other and disposed in a grid form in plan view. An area surrounded by adjacent two scanning lines 241 and adjacent two data lines 242 corresponds to the pixel P. The transistor 23, the pixel electrode 24 and a capacitance element 25 are provided for each pixel P. The pixel electrode 24 is provided corresponding to the transistor 23. One of the transistors 23 is disposed for one of the pixel electrodes 24. Each of the pixel electrodes 24 is electrically coupled to the drain of the corresponding transistor 23.

Each of the m constant potential lines 243 extends in the Y1 direction, and the m constant potential lines 243 are arrayed at an equal interval in the X1 direction. The constant potential Vcom is applied to each of the constant potential lines 243. Each of the constant potential lines 243 is a capacitance line electrically coupled to one of two electrodes of each of the corresponding capacitance elements 25. Each of the capacitance elements 25 is a retention capacitor for storing a potential of the pixel electrode 24. The capacitance elements 25 are provided one-to-one at the transistors 23. Further, the other of the two electrodes of each of the capacitance elements 25 is electrically coupled to the pixel electrode 24 and the drain of the transistor 23.

When the scanning signals G1, G2, . . . , and Gn sequentially become active, and the n scanning lines 241 are sequentially selected, the transistors 23 coupled to the selected scanning line 241 are turned on. Then, the potentials corresponding to the image signals S1, S2, . . . , and Sm with amplitudes corresponding to the gradations to be displayed are applied via the m data lines 242 to the pixel electrodes 24 of the pixels P corresponding to the selected scanning line 241. Thus, the voltage corresponding to the gradation to be displayed is applied to the liquid crystal capacitance formed between each pixel electrode 24 and the facing electrode 32, and the alignment of the liquid crystal molecules 50 changes in accordance with the applied voltage. In addition, the applied voltage is held by the capacitance element 25. Such a change in the alignment of the liquid crystal molecules 50 causes the light LL to be modulated, thus enabling gradation display.

A-3. Structure of Part of Peripheral Area A20 of Electro-optical Device 100

Figure 4:
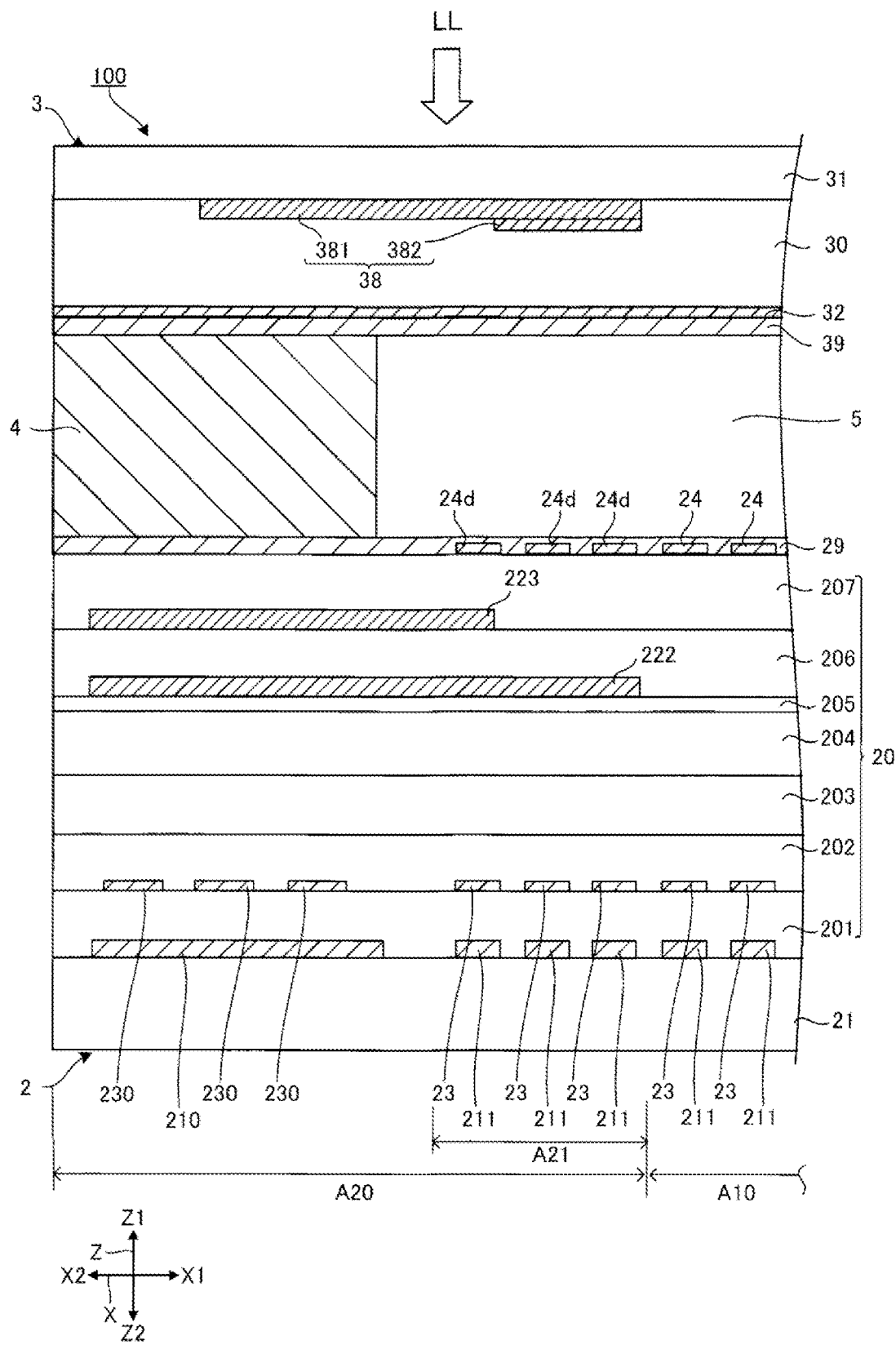
FIG. 4 is a diagram illustrating a cross-sectional structure in a peripheral area of the electro-optical device in FIG. 2.

FIG. 4 is a diagram illustrating a cross-sectional structure in the peripheral area A20 of the electro-optical device 100 in FIG. 2. As described above, the first substrate 2 includes the substrate 21, the layered body 20, the plurality of pixel electrodes 24, the plurality of dummy pixel electrodes 24d, and the alignment film 29.

As illustrated in FIG. 4, the layered body 20 includes insulating layers 201, 202, 203, 204, 205, 206, and 207 layered in order from the substrate 21. Each of these layers has a transmissive property and an insulating property. Examples of the material of each of the insulating layers 201 to 205 include an inorganic material including silicon such as silicon oxide and silicon oxynitride. In addition, the above-described transistors 23, various wiring lines, and the like are disposed in the display area A10 of the layered body 20. The plurality of transistors 23 are also provided in the dummy pixel area A21 of the layered body 20.

In addition, a light blocking film 210, a plurality of second transistors 230 included in the driving circuit 10, a light blocking layer 222, and a reflection layer 223 are provided in the peripheral area A20 of the first substrate 2. The reflection layer 223 is an example of a "first reflection layer". Note that the plurality of second transistors 230 are illustrated in a simplified manner.

The light blocking film 210 is disposed at the substrate 21. Although not illustrated, the plane shape of the light blocking film 210 is, for example, a rectangular frame shape. The light blocking film 210 overlaps the plurality of second transistors 230 in plan view. The light blocking film 210 is provided to prevent the incidence of the light LL on the second transistors 230. Examples of the material of the light blocking film 210 include metals such as tungsten (W), titanium (Ti), chromium (Cr), and iron (Fe), metal nitrides and metal silicides. Among these materials, the light blocking film 210 may include tungsten. Among various metals, tungsten is excellent in heat resistance, and its optical density (OD) value does not decrease easily through heat treatment during manufacturing, for example. Thus, with the light blocking film 210 including tungsten, the light blocking film 210 can effectively prevent the incidence of the light LL on the second transistors 230. Note that the light blocking film 210 may be disposed in a recessed portion formed in the substrate 21.

The plurality of second transistors 230 are disposed at the insulating layer 201. The configuration of each second transistor 230 is the same as that of each transistor 23 in FIG.

3 described above, and each second transistor 230 includes a gate, a source, and a drain. Although not illustrated, various wiring lines electrically coupled to each second transistor 230 are disposed at the layered body 20.

The light blocking layer 222 is disposed at the insulating layer 205. Although a plan view is omitted, the light blocking layer 222 overlaps the plurality of dummy pixel electrodes 24d and the seal member 4 in plan view. The light blocking layer 222 has a light absorbing property of absorbing the light LL and a light blocking property of blocking the entry of the light LL to a layer below the light blocking layer 222. The light absorbing property means a light absorbing property with respect to visible light. The light absorptance of the light blocking layer 222 with respect to visible light may be 50% or more, and furthermore may be 80% or more. The absorptance [%] is obtained by (100−transmittance [%]−reflectance [%]). By providing the light blocking layer 222, it is possible to suppress light leakage from the peripheral area A20 to the display area A10, that is, generation of unnecessary stray light.

The reflection layer 223 is disposed at the insulating layer 206. The reflection layer 223 has reflectivity with respect to the light LL. The "reflectivity" means reflectivity with respect to visible light. The reflectance of the reflection layer 223 with respect to visible light may be 50% or more, and furthermore may be 90% or more. Moreover, the reflectance of the reflection layer 223 with respect to visible light is higher than the reflectance of the above-described light blocking layer 222 with respect to visible light. The reflection layer 223 is a high-reflection film, and the light blocking layer 222 is a low-reflection film. By providing the reflection layer 223, which is a high-reflection film, the reflection layer 223 can reflect the light LL.

Figure 5:
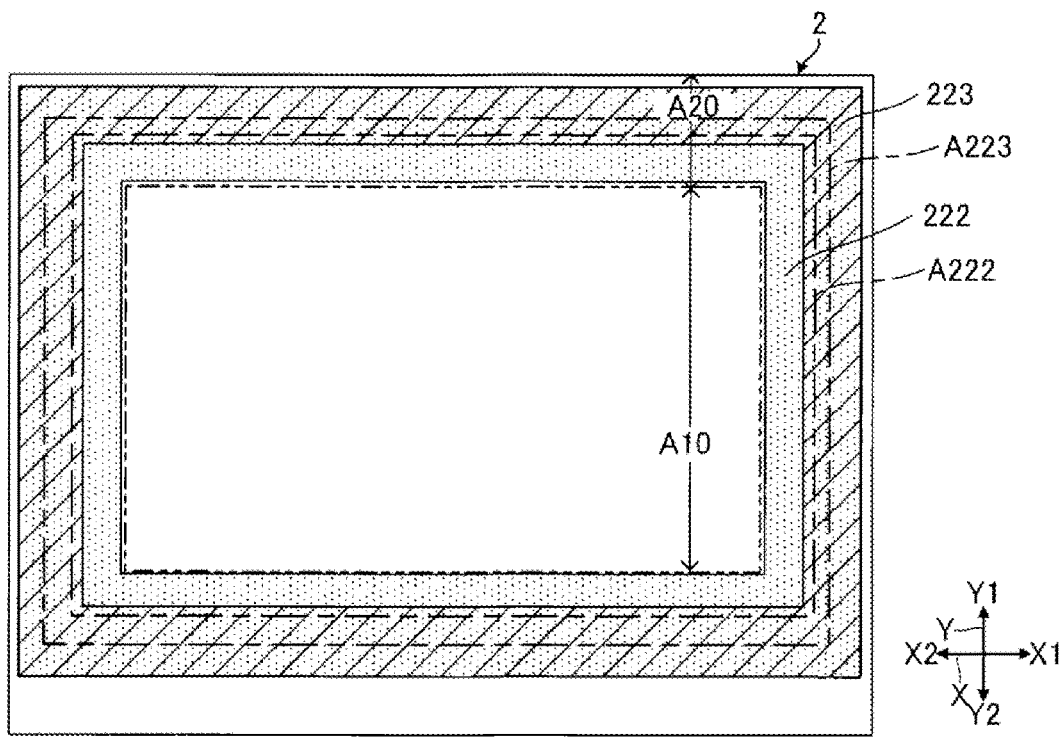
FIG. 5 is a diagram illustrating a plane arrangement of a light blocking layer and a reflection layer included in the first substrate in FIG. 4.

FIG. 5 is a diagram illustrating a plane arrangement of the light blocking layer 222 and the reflection layer 223 illustrated in FIG. 4. In FIG. 5, for convenience, the light blocking layer 222 is indicated by dots, and the reflection layer 223 is indicated by oblique lines.

As illustrated in FIG. 5, the plane shape of each of the light blocking layer 222 and the reflection layer 223 is a rectangular frame shape. As illustrated in FIGS. 4 and 5, the light blocking layer 222 is provided closer to the display area A10 than the reflection layer 223 is to the display area A10. In other words, the light blocking layer 222 is provided on an inner side of the first substrate 2 than the reflection layer 223. Specifically, as illustrated in FIG. 5, a center line A222 of the frame shape of the light blocking layer 222 in plan view is closer to the display area A10 than a center line A223 of the frame shape of the reflection layer 223 is to the display area A10 in plan view. In the illustrated example, the inner edge of the light blocking layer 222 is closer to the display area A10 than the inner edge of the reflection layer 223 is to the display area A10. The outer edge of the light blocking layer 222 and the outer edge of the reflection layer 223 overlap each other in plan view. Moreover, the plane area of the light blocking layer 222 is larger than the plane area of the reflection layer 223. Furthermore, the light blocking layer 222 overlaps the reflection layer 223 in plan view.

Since the light blocking layer 222 is disposed closer to the display area A10 than the reflection layer 223 is to the display area A10, the light blocking layer 222 can suppress light leakage from the peripheral area A20 to the display area A10, that is, generation of unnecessary stray light. Thus, the display quality of the electro-optical device 100 can be enhanced. Further, by providing the reflection layer 223, the reflection layer 223 can reflect the light LL. For this reason, it is possible to suppress the temperature rise of various wiring lines and the like due to the incidence of the light LL on the various wiring lines and the like at a layer below the reflection layer 223. Accordingly, the temperature rise of the first substrate 2 can be suppressed. Thus, the possibility of degradation of the liquid crystal of the liquid crystal layer 5 is suppressed. Thus, the quality reliability of the electro-optical device 100 can be enhanced.

When the reflection layer 223 is provided closer to the display area A10 than the light blocking layer 222 is to the display area A10, light reflected by the reflection layer 223 may enter the display area A10 as stray light. When only the reflection layer 223 is provided and the light blocking layer 222 is not provided, light reflected by the reflection layer 223 may similarly enter the display area A10 as stray light. Moreover, when only the light blocking layer 222 is provided and the reflection layer 223 is not provided, the light blocking layer 222 absorbs the light LL. Thus, when the reflection layer 223 is not provided, the temperature of the light blocking layer 222 rises and the temperature of the first substrate 2 rises as compared with when the reflection layer 223 is provided.

On the other hand, in the embodiment, the light blocking layer 222 and the reflection layer 223 are provided, and the light blocking layer 222 is disposed closer to the display area A10 than the reflection layer 223 is to the display area A10. Thus, it is possible to suppress light leakage while suppressing the temperature rise of the first substrate 2.

Note that the plane shape of each of the light blocking layer 222 and the reflection layer 223 may be other than a frame shape, and these layers may be scattered. However, each function is suitably exhibited in the case of the frame shape as compared with when these layers are scattered. When the light blocking layer 222 and the reflection layer 223 do not have a frame shape and these layers are scattered, the center of the light blocking layers 222 in plan view is closer to the display area A10 than the center of the reflection layers 223 in plan view is to the display area. Thus, it is possible to suppress light leakage in the peripheral area A20 while suppressing the temperature rise of the first substrate 2.

In addition, the light blocking layer 222 overlaps the plurality of dummy pixel electrodes 24d in plan view, and the light blocking layer 222 includes a part disposed in the dummy pixel area A21. Since the light blocking layer 222 includes the part disposed in the dummy pixel area A21, it is possible to suppress light leakage from the peripheral area A20 to the display area A10 as compared with when the light blocking layer does not include such a part. Also, the reflection layer 223 is partially disposed in the dummy pixel area A21. The inner edge of the reflection layer 223 overlaps the dummy pixel electrode 24d in plan view.

As illustrated in FIG. 4, the light blocking layer 222 and the reflection layer 223 are disposed in different layers. The light blocking layer 222 is disposed at the insulating layer 205, and the reflection layer 223 is disposed at the insulating layer 206. The light blocking layer 222 and the reflection layer 223 are not in contact with each other because these layers are provided in different layers. Thus, for example, when the reflection layer 223 is layered on the light blocking layer 222, it is necessary to partially expose the light blocking layer 222 by partially removing the reflection layer 223 in order to suppress light leakage. On the other hand, when the light blocking layer 222 and the reflection layer 223 are disposed at different layers, it is possible to omit the above-described process of partially exposing the light blocking layer 222.

Further, in the example illustrated in FIG. 4, the reflection layer 223 is disposed closer to the incident side of the light LL than the light blocking layer 222 is to the incident side. For this reason, the reflection layer 223 can suppress the temperature rise of the light blocking layer 222 due to the incidence of the light LL on the light blocking layer 222. Thus, even when the plane area of the light blocking layer 222 is larger than the plane area of the reflection layer 223, it is possible to effectively suppress the temperature rise of the first substrate 2.

Moreover, the reflection layer 223 is in contact with the insulating layer 207 closest to the liquid crystal layer 5 in the layered body 20. Thus, the reflection layer 223 is disposed closer to the incident side of the light LL than various wiring lines electrically coupled to the second transistors 230 are to the incident side. For this reason, it is possible to suppress temperature rise due to the incidence of the light LL on the various wiring lines. In addition, the reflection layer 223 is in contact with the insulating layer 207 immediately below the pixel electrodes 24, which can suppress the entry of the light LL deep in the first substrate 2 in the peripheral area A20. For this reason, it is possible to particularly effectively suppress the temperature rise of the first substrate 2 due to the incidence of the light LL.

In addition, examples of the material of the light blocking layer 222 include metals such as tungsten, titanium, chromium, and iron, metal nitrides such as titanium nitride, and metal silicides. Among these materials, the light blocking layer 222 may include titanium nitride, tungsten or tungsten silicide. These materials are excellent in light absorbing property. Thus, by including such a material, it is possible to suppress light leakage from the peripheral area A20 to the display area A10 as compared with the case of using another material.

Examples of the material of the reflection layer 223 include metals such as gold, silver, copper, iron, and aluminum, or metal compounds. Among these materials, the reflection layer 223 may include aluminum or copper and may particularly include aluminum. Aluminum is particularly excellent in reflectance of visible light. Thus, by including aluminum, the reflection layer 223 can particularly suitably exert reflectivity. Aluminum is also used as a material for various wiring lines. Thus, when the wiring lines are disposed in the same layer as the reflection layer 223, the reflection layer 223 can be formed at the same time as the wiring lines.

Note that although the alignment film 29 is provided between the insulating layer 207 and the seal member 4 in the peripheral area A20, the alignment film 29 may not be provided therebetween. That is, the alignment film 29 may be provided only in the display area A10.

As illustrated in FIG. 4, the partition portion 38 included in the second substrate 3 includes a reflection layer 381 and a light blocking layer 382. The reflection layer 381 is an example of the "first reflection layer". Note that in the example illustrated in FIG. 4, the reflection layer 381 and the light blocking layer 382 are formed at the substrate 31, but may be formed at any of the plurality of insulating films included in the layered body 30.

The reflection layer 381 has reflectivity with respect to the light LL. The reflectance of the reflection layer 381 with respect to visible light may be 50% or more, and furthermore may be 90% or more. Although a plan view is omitted, the reflection layer 381 overlaps the plurality of dummy pixel electrodes 24d and the seal member 4 in plan view.

The light blocking layer 382 is disposed at the reflection layer 381. The light blocking layer 382 is layered at the reflection layer 381 and is in contact with the reflection layer 381. The light blocking layer 382 has a light absorbing property of absorbing the light LL and a light blocking property of blocking the entry of the light LL. The light absorptance of the light blocking layer 382 with respect to visible light may be 50% or more, and furthermore may be 80% or more. By providing the light blocking layer 382, it is possible to suppress light leakage from the peripheral area A20 to the display area A10, that is, generation of unnecessary stray light.

Moreover, the reflectance of the reflection layer 381 with respect to visible light is higher than the reflectance of the light blocking layer 382 with respect to visible light. The reflection layer 381 is a high-reflection film, and the light blocking layer 382 is a low-reflection film. By providing the reflection layer 381, which is such a high-reflection film, the reflection layer 381 can reflect the light LL.

Figure 6:
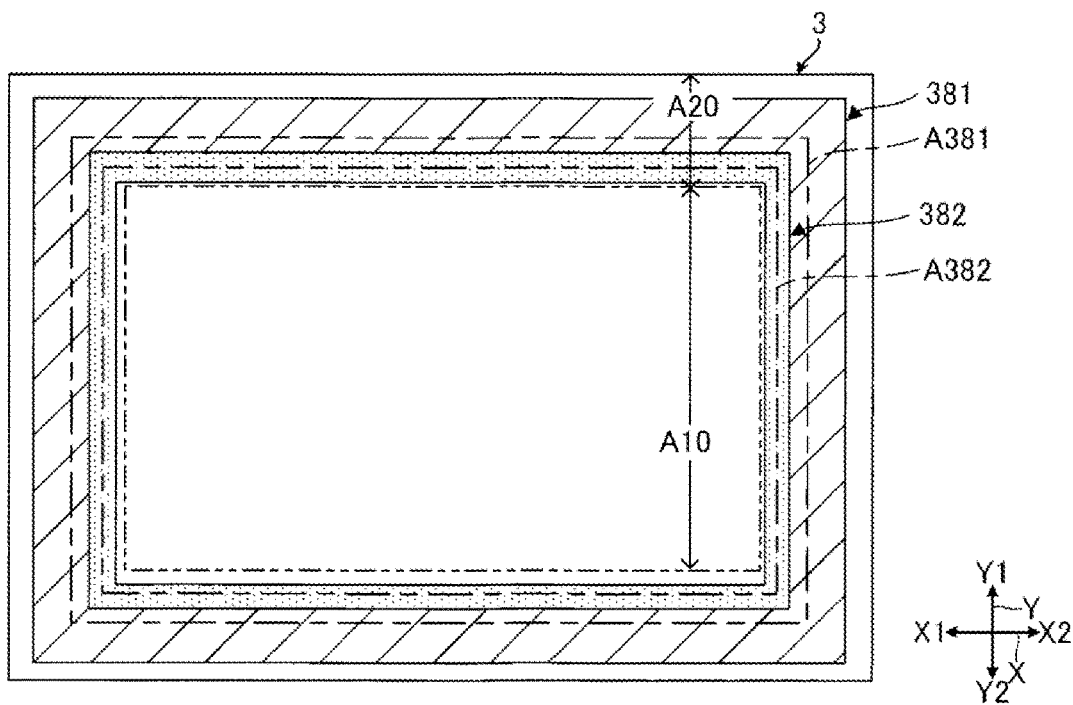
FIG. 6 is a diagram illustrating a plane arrangement of a light blocking layer and a reflection layer included in a second substrate in FIG. 4.

FIG. 6 is a diagram illustrating a plane arrangement of the light blocking layer 382 and the reflection layer 381 illustrated in FIG. 4. In FIG. 6, for convenience, the light blocking layer 382 is indicated by dots, and the reflection layer 381 is indicated by oblique lines.

As illustrated in FIG. 6, the plane shape of each of the reflection layer 381 and the light blocking layer 382 is a rectangular frame shape. As illustrated in FIGS. 4 and 6, the light blocking layer 382 is provided closer to the display area A10 than the reflection layer 381 is to the display area A10 in plan view. In other words, the light blocking layer 382 is provided on an inner side of the second substrate 3 than the reflection layer 381. Specifically, as illustrated in FIG. 6, a center line A382 of the frame shape of the light blocking layer 382 in plan view is closer to the display area A10 than a center line A381 of the frame shape of the reflection layer 381 in plan view is to the display area A10. Moreover, the outer edge of the light blocking layer 382 is closer to the display area A10 than the outer edge of the reflection layer 381 is to the display area A10. In the illustrated example, the inner edge of the light blocking layer 382 and the inner edge of the reflection layer 381 overlap each other in plan view.

Since the light blocking layer 382 is disposed closer to the display area A10 than the reflection layer 381 is to the display area A10, the light blocking layer 382 can suppress light leakage from the peripheral area A20 to the display area A10, that is, generation of unnecessary stray light. Thus, the display quality of the electro-optical device 100 can be enhanced. Further, by providing the reflection layer 381, the reflection layer 381 can reflect the light LL. Thus, it is possible to suppress the temperature rise of the second substrate 3 due to the incidence of the light LL on a part of the second substrate 3 closer to the liquid crystal layer 5 than the reflection layer 381 is to the liquid crystal layer 5. In addition, it is possible to suppress the temperature rise of the first substrate 2 due to the incidence of the light LL on the first substrate 2. Thus, it is possible to suppress the temperature rise of the first substrate 2 and the second substrate 3. Thus, the possibility of degradation of the liquid crystal of the liquid crystal layer 5 is suppressed. Thus, the quality reliability of the electro-optical device 100 can be enhanced.

When the reflection layer 381 is provided closer to the display area A10 than the light blocking layer 382 is to the display area A10, light reflected by the reflection layer 381 may enter the display area A10 as stray light. When only the reflection layer 381 is provided and the light blocking layer 382 is not provided, light reflected by the reflection layer 381 may similarly enter the display area A10 as stray light. Moreover, when only the light blocking layer 382 is provided and the reflection layer 381 is not provided, the light blocking layer 382 absorbs the light LL. Thus, when the reflection layer 381 is not provided, the temperature of the light blocking layer 382 rises and the temperature of the second substrate 3 rises as compared with when the reflection layer 381 is provided.

On the other hand, in the embodiment, the light blocking layer 382 and the reflection layer 381 are provided and the light blocking layer 382 is disposed closer to the display area A10 than the reflection layer 381 is to the display area A10. Thus, it is possible to suppress light leakage while suppressing the temperature rise of the second substrate 3 and the first substrate 2.

Note that the plane shape of each of the reflection layer 381 and the light blocking layer 382 may be other than a frame shape, and these layers may be scattered. However, each function is suitably exhibited in the case of the frame shape as compared with when these layers are scattered. When the light blocking layer 382 and the reflection layer 381 do not have a frame shape and these layers are scattered, the center of the light blocking layers 382 in plan view is closer to the display area A10 than the center of the reflection layers 381 in plan view is to the display area A10.

In addition, a part or the whole of the light blocking layer 382 overlaps the plurality of dummy pixel electrodes 24d in plan view and is disposed in the dummy pixel area A21. Since the light blocking layer 382 includes a part disposed in the dummy pixel area A21, it is possible to suppress light leakage from the peripheral area A20 to the display area A10 as compared with when the light blocking layer 382 does not include such a part. Also, the reflection layer 381 is partially disposed in the dummy pixel area A21. The inner edge of the reflection layer 381 overlaps the dummy pixel electrode 24d in plan view. Moreover, a part or the whole of the light blocking layer 382 overlaps the light blocking layer 222 in plan view. The light blocking layer 382 partially overlaps the reflection layer 223 in plan view, and the light blocking layer 382 includes a part located closer to the display area A10 than the reflection layer 223 is to the display area A10 in plan view. Moreover, a part or the whole of the reflection layer 381 overlaps the reflection layer 223 in plan view. A part or the whole of the reflection layer 381 also overlaps the light blocking layer 222 in plan view.

Furthermore, as described above, the light blocking layer 382 is in contact with the reflection layer 381, and the plane area of the light blocking layer 382 is smaller than the plane area of the reflection layer 381. Thus, the thickness of the second substrate 3 can be made smaller than when the light blocking layer 382 and the reflection layer 381 are provided in different layers. Note that the light blocking layer 382 is formed, for example, as follows. For example, a light blocking film having the same shape in plan view as the reflection layer 381 is formed at the reflection layer 381. Thereafter, the light blocking film is patterned by etching to form the light blocking layer 382.

In the example illustrated in FIG. 4, the reflection layer 381 is disposed closer to the incident side of the light LL than the light blocking layer 382 is to the incident side. For this reason, the reflection layer 381 can suppress the temperature rise of the light blocking layer 382 due to the incidence of the light LL on the light blocking layer 382. This effectively suppresses the temperature rise of the second substrate 3.

Examples of the material of the reflection layer 381 include metals such as gold, silver, copper, iron, and aluminum, and metal compounds. Among these materials, the reflection layer 381 may include aluminum or copper and may particularly include aluminum. Aluminum is particularly excellent in reflectance of visible light. Thus, by including aluminum, the reflection layer 381 can suitably exhibit reflectivity.

Examples of the material of the light blocking layer 382 include metals such as tungsten, titanium, chromium, and iron, metal nitrides such as titanium nitride, and metal silicides. Among these materials, the light blocking layer 382 may include titanium nitride, tungsten or tungsten silicide. These materials are excellent in light absorbing property. Thus, by including such a material, it is possible to suppress light leakage from the peripheral area A20 to the display area A10 as compared with the case of using another material.

As described above, in the embodiment, the first substrate 2 includes the light blocking layer 222 and the reflection layer 223, and the second substrate 3 includes the light blocking layer 382 and the reflection layer 381. Thus, each of the first substrate 2 and the second substrate 3 includes the "light blocking layer" and the "reflection layer". Thus, since both substrates include the "light blocking layer" and the "reflection layer", the quality reliability of the electro-optical device 100 can be improved as compared with when one of the first substrate 2 and the second substrate 3 does not include the "light blocking layer" or the "reflection layer".

A-4. Optical Paths in Peripheral Area A20

Figure 7:
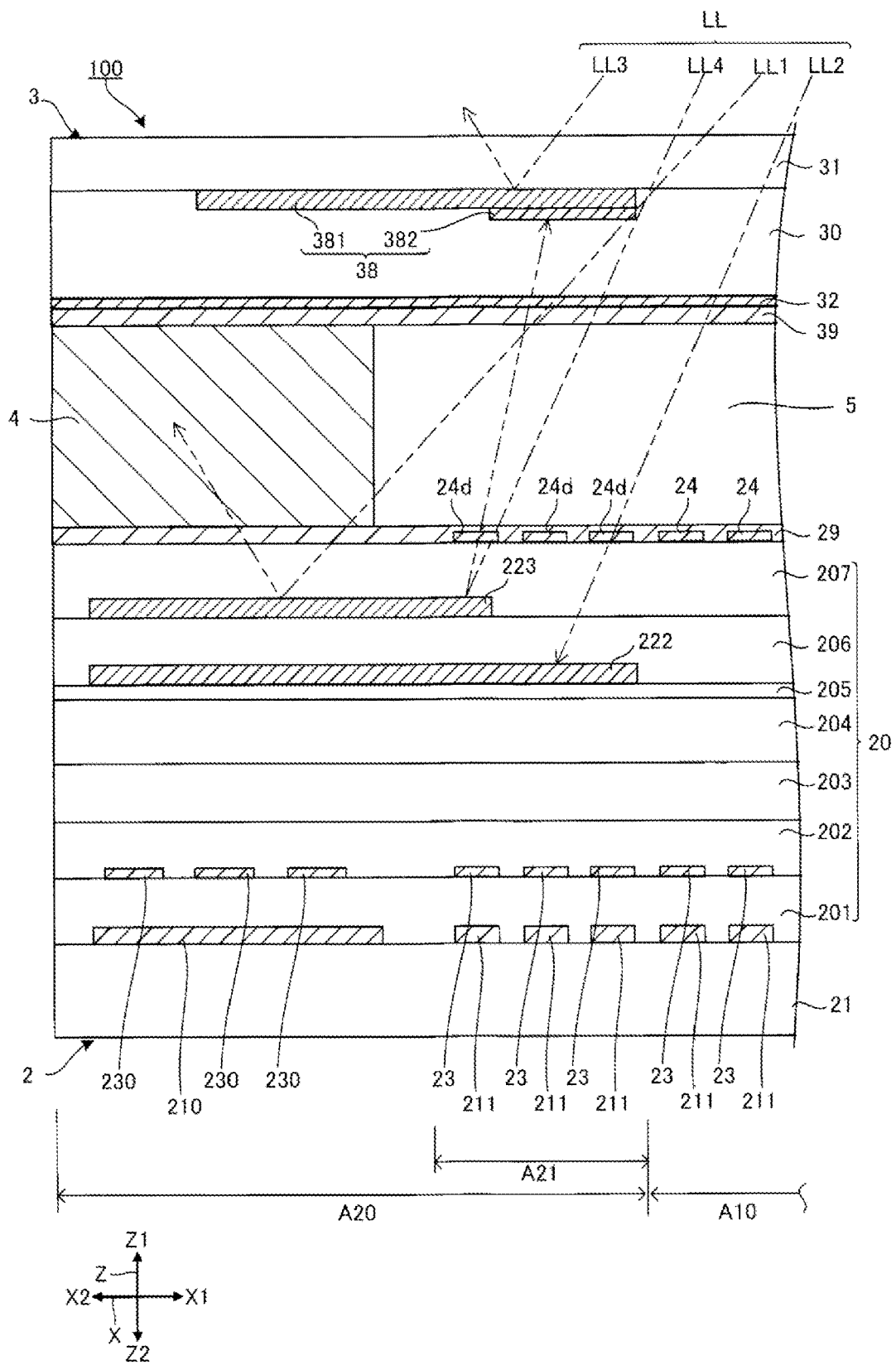
FIG. 7 is a diagram for describing optical paths in the peripheral area of the electro-optical device in FIG. 4.

FIG. 7 is a diagram for describing optical paths in the peripheral area A20 in FIG. 4. The light LL is emitted over a certain spread angle.

As described above, the reflection layer 223 is provided at the first substrate 2. Thus, as illustrated in FIG. 7, for example, light LL1 included in the light LL is reflected by the reflection layer 223. For this reason, it is possible to suppress the temperature rise of various wiring lines due to the incidence of the light LL, which thus can suppress the temperature rise of the first substrate 2. Further, the reflection layer 223 is disposed closer to the incident side of the light LL than the light blocking layer 222 is to the incident side. For this reason, as described above, it is possible to suppress the incidence of the light LL on the light blocking layer 222, which thus can particularly effectively suppress the temperature rise of the first substrate 2.

Moreover, the light blocking layer 222 is disposed closer to the display area A10 than the reflection layer 223 is to the display area A10. Thus, for example, light LL2 included in the light LL can be absorbed by the light blocking layer 222. Thus, as described above, it is possible to suppress light leakage from the peripheral area A20 to the display area A10.

Further, the reflection layer 381 is provided at the second substrate 3. Accordingly, for example, light LL3 included in the light LL is reflected by the reflection layer 381. Thus, since the incidence of the light LL on a part closer to the liquid crystal layer 5 than the reflection layer 381 is to the liquid crystal layer 5 is suppressed, the temperature rise of the second substrate 3 and the first substrate 2 is suppressed. Further, the reflection layer 381 is disposed closer to the incident side of the light LL than the light blocking layer 382 is to the incident side. Thus, as described above, it is possible to suppress the incidence of the light LL on the light blocking layer 382, which thus can particularly effectively suppress the temperature rise of the second substrate 3.

Moreover, the light blocking layer 382 is disposed closer to the display area A10 than the reflection layer 381 is to the display area A10. Thus, for example, light LL4 included in the light LL is reflected by the reflection layer 223 and the reflected light can be absorbed by the light blocking layer 382. Thus, it is possible to suppress light leakage from the peripheral area A20 to the display area A10. In particular, the light blocking layer 382 partially overlaps the reflection layer 223 in plan view, and the light blocking layer 382 includes a part located closer to the display area A10 than the reflection layer 223 is to the display area A10 in plan view. Thus, the light blocking layer 382 can effectively absorb light reflected by the reflection layer 223.

A-7. Plane Arrangement of Pixel Electrodes 24 and Transistors 23 in Display Area A10

Figure 8:
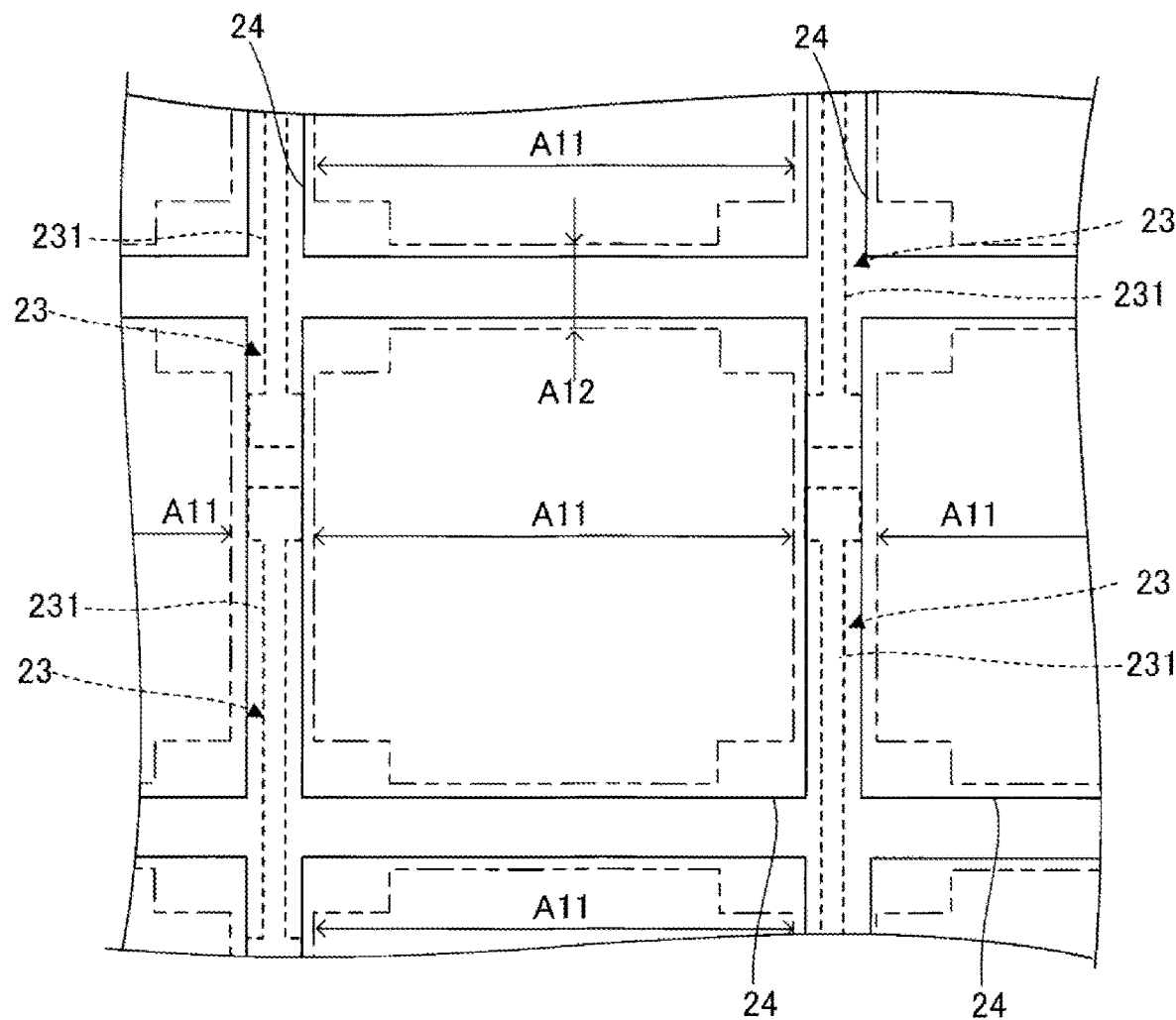
FIG. 8 is a diagram illustrating a plane arrangement of pixel electrodes and second transistors in FIG. 2.
Figure 8:
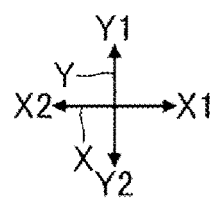

FIG. 8 is a diagram illustrating a plane arrangement of the pixel electrodes 24 and the transistors 23 in FIG. 2. As illustrated in FIG. 8, the plurality of pixel electrodes 24 are spaced apart from each other and disposed in a matrix in plan view. The plane shape of each pixel electrode 24 is a rectangular shape. Each transistor 23 is provided at a position corresponding to the lower left corner of the drawing among the four corners of a corresponding one of the pixel electrodes 24 in plan view. FIG. 4 illustrates a below-described semiconductor layer 231 included in the transistor 23.

In addition, the electro-optical device 100 is provided with a plurality of opening portions A11 and a light blocking area A12. Each opening portion A11 is an area that transmits the light LL. The plurality of pixel electrodes 24 are disposed one-to-one in the plurality of opening portions A11. Thus, the plurality of opening portions A11 are spaced apart from each other and disposed in a matrix in plan view. Each opening portion A11 has a substantially rectangular shape.

The light blocking area A12 has a frame shape surrounding the plurality of opening portions A11 in plan view. The light blocking area A12 is an area that prevents the light LL from transmitting. The plurality of transistors 23 are disposed in the light blocking area A12. Various wiring lines and the like are also disposed in the light blocking area A12. Note that the outer edge portion of each pixel electrode 24 is located in the light blocking area A12.

A-8. Cross-sectional Structure of Part of Display Area A10 of First Substrate 2

Figure 9:
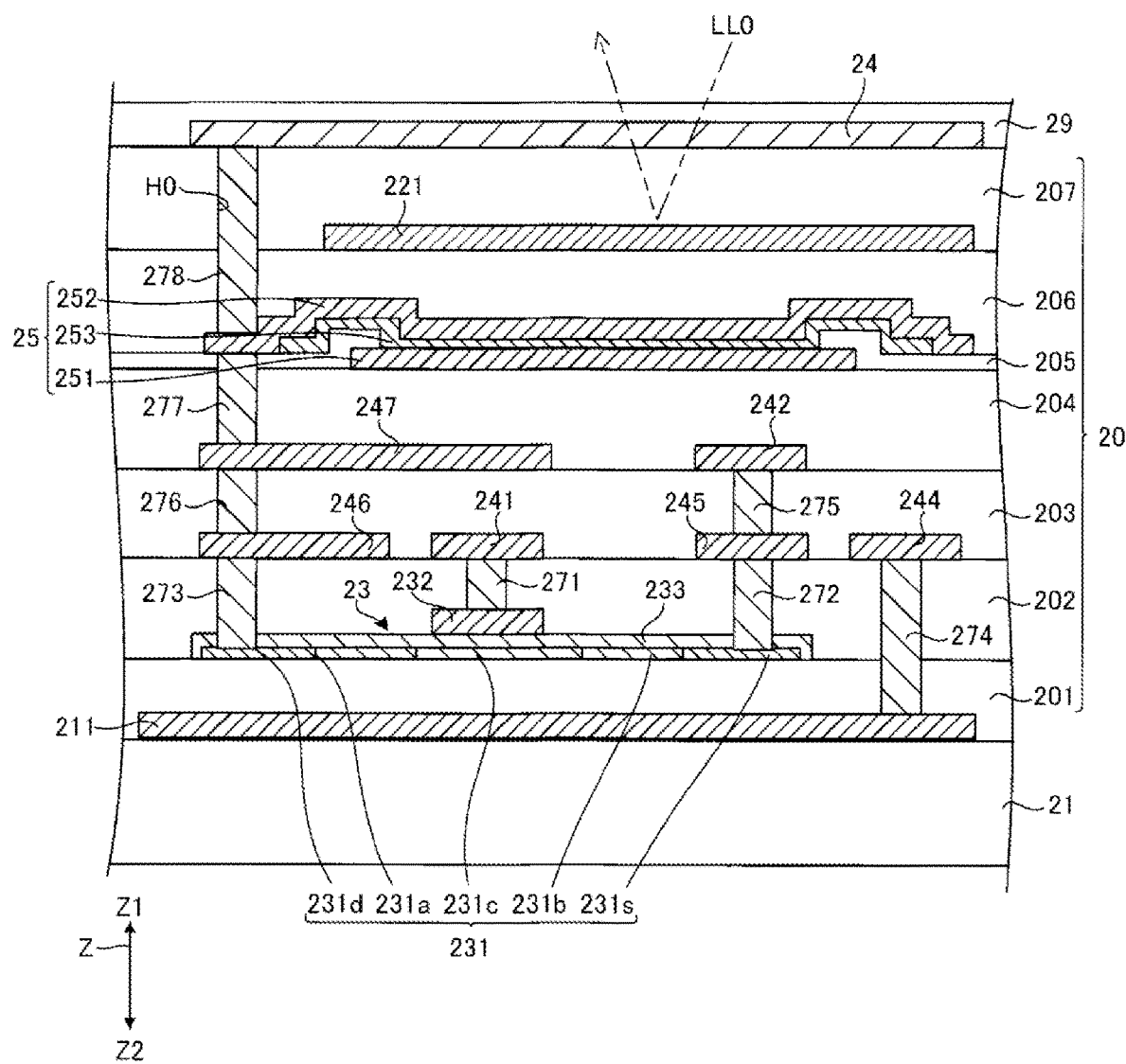
FIG. 9 is a diagram illustrating a cross-sectional structure in a display area of the first substrate in FIG. 2.

FIG. 9 is a diagram illustrating a cross-sectional structure in the display area A10 of the first substrate 2 of FIG. 2. FIG. 9 illustrates a cross section corresponding to one pixel electrode 24.

As illustrated in FIG. 9, a light blocking film 211 is disposed at the substrate 21. The light blocking film 211 is provided to prevent the incidence of light on the semiconductor layer 231 included in the transistor 23. Examples of the material of the light blocking film 211 include metals such as tungsten, titanium, chromium, and iron, metal nitrides, and metal silicides. Among these materials, the light blocking film 211 may include tungsten for the same reason as that of the light blocking film 210. Note that the light blocking film 211 may be disposed in a recessed portion formed in the substrate 21.

The transistor 23 is disposed at the insulating layer 201. The transistor 23 includes the semiconductor layer 231, a gate electrode 232, and a gate insulating film 233. The semiconductor layer 231 is disposed at the insulating layer 201. The gate insulating film 233 is provided between the semiconductor layer 231 and the gate electrode 232.

The semiconductor layer 231 has a lightly doped drain (LDD) structure. Specifically, the semiconductor layer 231 includes a drain area 231$d$, a source area 231$s$, a channel area 231$c$, a low-concentration drain area 231$a$ and a low-concentration source area 231$b$. The semiconductor layer 231 is made of polysilicon, for example. The area excluding the channel area 231$c$ is doped with impurities that increase conductivity. The impurity concentration in the low-concentration drain area 231$a$ is lower than the impurity concentration in the drain area 231$d$. The impurity concentration in the low-concentration source area 231$b$ is lower than the impurity concentration in the source area 231$s$.

The gate electrode 232 is made of polysilicon doped with impurities that increase conductivity, for example. Note that the gate electrode 232 may be made of a conductive material of a metal, metal oxide, and metal compound. Moreover, the gate electrode 232 is electrically coupled to the light blocking film 211 via a conductive coupling portion 271 disposed in a hole extending through the insulating layers 201 and 202. In addition, the gate insulating film 233 is composed of a silicon oxide film deposited by a heat oxidation or chemical vapor deposition (CVD) method or the like.

The scanning line 241, a relay layer 245, a relay layer 246, and an electrode 244 are disposed at the insulating layer 202. The scanning line 241 is electrically coupled to the gate electrode 232 via a conductive coupling portion 271 disposed in a hole extending through the insulating layer 202. The relay layer 245 and the relay layer 246 have conductivity. The relay layer 245 is electrically coupled to the source area 231$s$ of the semiconductor layer 231 via a conductive coupling portion 272 disposed in a hole extending through the insulating layer 202. The relay layer 246 is electrically coupled to the drain area 231$d$ of the semiconductor layer 231 via a conductive coupling portion 273 disposed in a hole extending through the insulating layer 202. The electrode 244 is electrically coupled to the light blocking film 211 via a conductive coupling portion 274 disposed in a hole extending through the insulating layers 201 and 202. The electrode 244 may be electrically coupled to the scanning line 241.

Note that each of the coupling portions 271 to 274 may be a so-called trench-type electrode formed integrally with a coupled wiring line and the like, or may be a contact plug.

The data line 242 and the relay layer 247 are disposed at the insulating layer 203. The data line 242 is electrically coupled to the relay layer 245 via a conductive coupling portion 275 disposed in a hole extending through the insulating layer 203. The relay layer 247 is electrically coupled to the relay layer 246 via a conductive coupling portion 276 disposed in a hole extending through the insulating layer 203. Note that each of the coupling portions 275 and 276 may be a so-called trench-type electrode formed integrally with a coupled wiring line and the like, or may be a contact plug.

The capacitance element 25 is disposed at the insulating layer 204. The capacitance element 25 includes a first capacitance electrode 251, a second capacitance electrode 252, and a dielectric layer 253. The first capacitance electrode 251 is disposed at the insulating layer 205. The second capacitance electrode 252 is disposed at the insulating layer 205. In other words, the second capacitance electrode 252 is disposed at a layer between the transistor 23 and the pixel electrode 24. The dielectric layer 253 is disposed between the first capacitance electrode 251 and the second capacitance electrode 252.

The first capacitance electrode 251 constitutes a part of the above-described constant potential line 243. The second capacitance electrode 252 corresponds to a "relay electrode". The second capacitance electrode 252 is electrically coupled to the relay layer 247 via a conductive coupling portion 277 disposed in a hole extending through the insulating layer 204. Note that the coupling portion 277 may be a so-called trench-type electrode formed integrally with the second capacitance electrode 252 or may be a contact plug.

Each of the first capacitance electrode 251 and the second capacitance electrode 252 is made of a conductive material such as conductive polysilicon, metal silicide, metal, or metal compound. In this embodiment, each of the first capacitance electrode 251 and the second capacitance electrode 252 includes titanium nitride (TiN), tungsten, or tungsten silicide (WSi). Moreover, the dielectric layer 253 is made of High-K, which is a high-dielectric material.

The second reflection layer 221 is disposed at the insulating layer 206. The second reflection layer 221 has reflectivity for reflecting the light LL. The reflectance of the second reflection layer 221 with respect to visible light may be 50% or more, and furthermore may be 90% or more. Further, the pixel electrode 24 is disposed at the insulating layer 207. The pixel electrode 24 is electrically coupled to the second capacitance electrode 252 via a contact plug 278. The contact plug 278 is a plug-shaped conductive portion with which a through hole H0 extending through the insulating layers 206 and 207 is filled. Moreover, the alignment film 29 is disposed at the pixel electrode 24.

In addition, the material of each of the coupling portions 271 to 277 and the contact plug 278 is not particularly limited, and examples of the material include metals such as tungsten, titanium, chromium, iron, and aluminum, metal nitrides, and metal silicides.

Each of the scanning line 241, the data line 242, the electrode 244, and the relay layers 245, 246, and 247 described above may include, for example, a metal such as aluminum or a metal compound such as titanium nitride and may be formed of a single layer or a plurality of layers. In particular, these elements may have a layered structure of an aluminum film and a titanium nitride film. With the aluminum film included, a low resistance can be achieved. In addition, by including the titanium nitride film, it is possible to avoid contact with each of the coupling portions 271 to 277 and suppress electrolytic corrosion of the aluminum film.

In addition, as described above, the contact plug 278 is provided at a layer between the second capacitance electrode 252 and the pixel electrode 24 and electrically couples the second capacitance electrode 252 and the pixel electrode 24. Furthermore, the second reflection layer 221 is disposed at a layer between the second capacitance electrode 252 and the pixel electrode 24.

The plug-shaped contact plug 278 with which the through hole H0 is filled is provided. Thus, unlike the related art, it is not necessary to provide a trench-type electrode provided along a wall surface of a contact hole, i.e., a hole formed in the insulating layer. The contact plug 278 can be favorably disposed even in the through hole H0 having a high aspect ratio. Thus, the second reflection layer 221 provided at the layer between the second capacitance electrode 252 and the pixel electrode 24 does not need to be used as a relay wiring line for electrically coupling the second capacitance electrode 252 and the pixel electrode 24. Thus, it is not necessary to electrically couple the second reflection layer 221 to the second capacitance electrode 252 and the pixel electrode 24. As a result, it is not necessary to couple an electrode provided along a contact hole to the second reflection layer 221. The second reflection layer 221 is insulated from the second capacitance electrode 252 and the pixel electrode 24.

Since it is not necessary to couple the electrode provided along the contact hole to the second reflection layer 221, it is easy to increase the plane area of the second reflection layer 221. Thus, it is possible to enhance a function of reflecting the light LL by the second reflection layer 221. As a result, the incidence of the light LL on the second capacitance electrode 252 and the like below the second reflection layer 221 is suppressed. Thus, it is possible to suppress a temperature rise due to the incidence of the light LL on the second capacitance electrode 252 and the like. Accordingly, the temperature rise of the first substrate 2 can be suppressed. For this reason, the possibility of degradation of the liquid crystal of the liquid crystal layer 5 or the possibility that characteristics as designed are not exhibited due to a change in the resistance value of the transistor 23 is suppressed. Thus, the quality reliability of the electro-optical device 100 can be improved.

By disposing the second reflection layer 221 in the display area A10 and disposing the reflection layer 223 in the peripheral area A20 as described above, it is possible to most effectively suppress the temperature rise of the first substrate 2.

Examples of the material of the second reflection layer 221 include metals such as gold, silver, copper, iron, and aluminum, and metal compounds. Among these materials, the second reflection layer 221 may include aluminum or copper, and may particularly include aluminum. Aluminum is particularly excellent in reflectance of visible light. For this reason, by including aluminum, the second reflection layer 221 can suitably exhibit reflectivity. Aluminum is also used as a material for various wiring lines. Thus, when the wiring lines are disposed at the same layer as the second reflection layer 221, the second reflection layer 221 can be formed simultaneously with the wiring lines.

Moreover, the second reflection layer 221 is provided at the same layer as the reflection layer 223 in the peripheral area A20 described above. Thus, the reflection layer 223 and the second reflection layer 221 can be formed at one time by, for example, patterning one reflection film. Thus, the reflection layer 223 and the second reflection layer 221 can be easily formed.

Further, the pixel electrode 24 is disposed at the insulating layer 207, and the second reflection layer 221 is in contact with the insulating layer 207. Thus, the second reflection layer 221 is disposed closer to the incident side of the light LL than various wiring lines are to the incident side. For this reason, it is possible to suppress a temperature rise due to the incidence of the light LL not only on the second capacitance electrode 252, but also on a wiring line disposed at a lower layer other than the second capacitance electrode 252. In addition, the second reflection layer 221 is provided at a layer immediately below the pixel electrode 24, which thus suppresses the entry of the light LL deep in the first substrate 2. For this reason, it is possible to particularly effectively suppress the temperature rise of the first substrate 2 due to the incidence of the light LL.

Moreover, the second capacitance electrode 252 includes, for example, titanium nitride, tungsten, or tungsten silicide as described above. In this case, the second capacitance electrode 252 easily absorbs the light LL, and the temperature easily rises due to the absorption of the light LL. Thus, when the second capacitance electrode 252 serving as the "relay electrode" includes any of the above-described materials and the second reflection layer 221 is disposed above the second capacitance electrode 252, it is possible to suppress the temperature rise of the second capacitance electrode 252. This effectively suppress the temperature rise of the first substrate 2.

As described above, examples of the material of the contact plug 278 include metals such as tungsten, titanium, chromium, iron and aluminum, metal nitrides, and metal silicides. Among these materials, the contact plug 278 may include tungsten. Among these metals, tungsten is excellent in filling property. Thus, by using tungsten, the through hole H0 having a high aspect ratio can be uniformly filled. Thus, it is easy to increase the plane area of the second reflection layer 221.

Further, the contact plug 278 may be composed of a single material or may be formed of a plurality of layers. For example, the contact plug 278 includes a barrier layer and a conductive layer. The barrier layer is in contact with the inner wall surface forming the through hole H0. The barrier layer is provided to prevent diffusion of components of the conductive layer. The conductive layer is disposed inside the barrier layer and the through hole H0 is filled with the conductive layer. The barrier layer may include tungsten nitride (WN) or titanium nitride (TiN). The conductive layer may include tungsten.

A-9. Plane Structure of Second Reflection Layer 221

Figure 10:
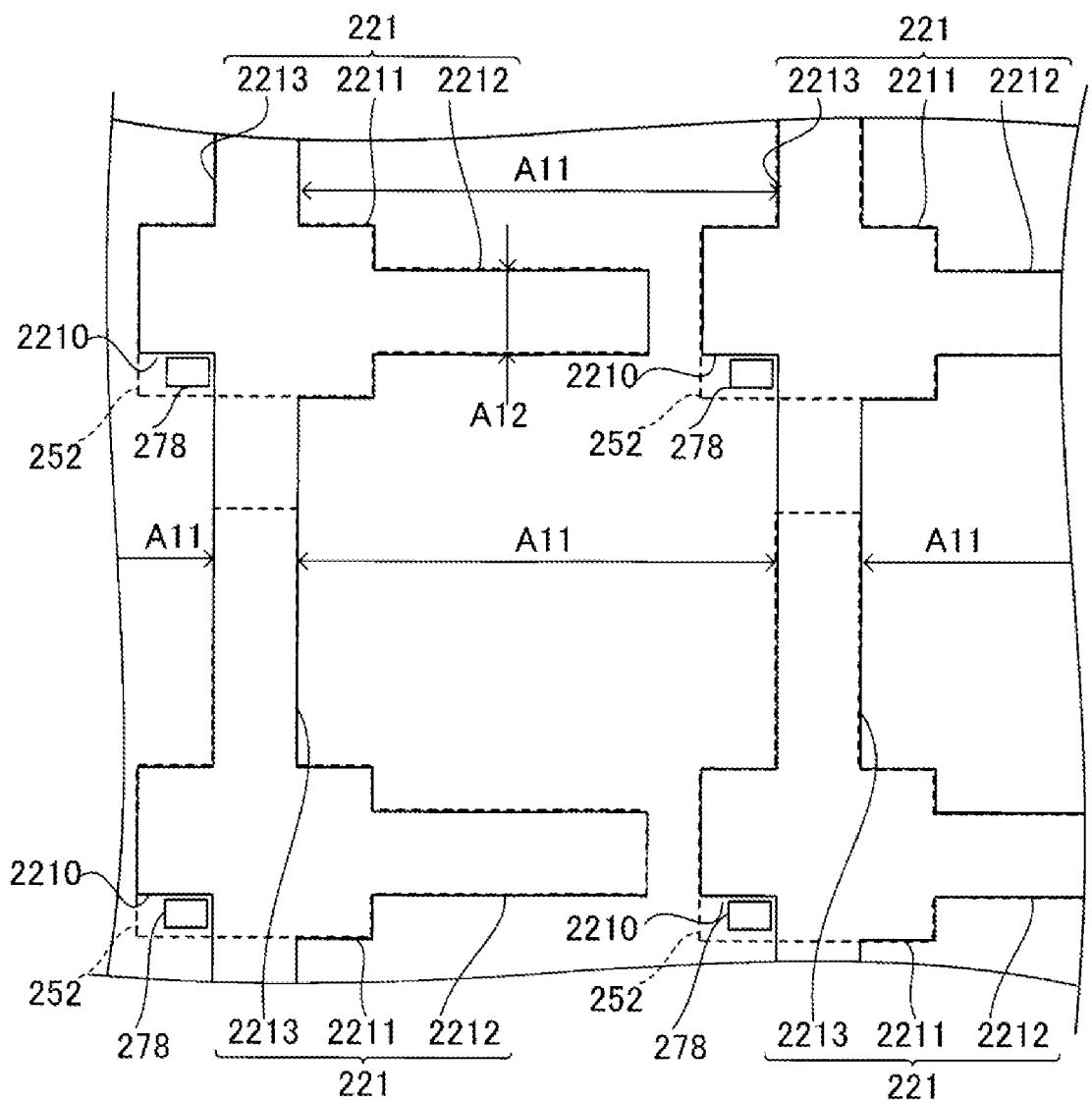
FIG. 10 is a plan view of a second reflection layer in FIG. 9.

FIG. 10 is a plan view of the second reflection layer 221 in FIG. 9. As illustrated in FIG. 10, the plane shape of each second reflection layer 221 is substantially a L shape, and the plurality of second reflection layers 221 arrayed along the Y-axis are coupled to each other.

Specifically, each second reflection layer 221 includes a wide portion 2211, an extended portion 2212, and an extended portion 2213. The wide portion 2211 is provided at a position corresponding to the lower left corner of the drawing among the four corners of the corresponding pixel electrode 24 in plan view. The extended portion 2212 extends from the wide portion 2211 in the X1 direction. The extended portion 2213 extends from the wide portion 2211 in the Y1 direction. The extended portion 2213 of one second reflection layer 221 is coupled to the wide portion 2211 of another second reflection layer 221 adjacent thereto in the Y1 direction.

The second reflection layer 221 illustrated in FIG. 10 is disposed along the above-described light blocking area A12 illustrated in FIG. 8. For this reason, although not illustrated, the second reflection layer 221 overlaps the transistor 23, the scanning line 241, the data line 242, the electrode 244, the relay layers 245 to 247, the first capacitance electrode 251, and the second capacitance electrode 252 in plan view.

Since the second reflection layer 221 is disposed in the light blocking area A12, it is possible to suppress the incidence of the light LL on various wiring lines and the like at a layer below the second reflection layer 221 in the light blocking area A12. In particular, since the second reflection layer 221 is disposed along the light blocking area A12, it is possible to further suppress the incidence of the light LL on the various wiring lines and the like at the layer below the second reflection layer 221 as compared with when the second reflection layers 221 are disposed in a scattered manner. Thus, it is possible to suppress a temperature rise due to the incidence of the light LL on the various wiring lines, which can effectively suppress the temperature rise of the first substrate 2.

Note that the second reflection layer 221 may not be disposed along the light blocking area A12, and the second reflection layers 221 may be disposed in a scattered manner. In the example illustrated in FIG. 10, two second reflection layers 221 adjacent to each other along the X-axis are not coupled to each other. However, one second reflection layer 221 may be coupled to another second reflection layer 221 adjacent thereto in the X1 direction. Thus, all of the plurality of second reflection layers 221 may form a frame shape. Due to the frame shape, it is possible to particularly effectively suppress a temperature rise due to the incidence of the light LL on the various wiring lines and the like. In the example illustrated in FIG. 10, one second reflection layer 221 is coupled to another second reflection layer 221 adjacent thereto in the Y1 direction, but may not be coupled.

As illustrated in FIG. 10, the light blocking film 211 is provided at a position different from that of the contact plug 278 in plan view and does not overlap the contact plug 278 in plan view. The contact plug 278 is provided corresponding to a notch portion 2210 included in the wide portion 2211. As described above, by using the contact plug 278, it is possible to increase the plane area of the second reflection layer 221 as compared with the case of using a trench-type electrode.

Moreover, the second capacitance electrode 252 overlaps the contact plug 278 and the second reflection layer 221 in plan view. Since the second capacitance electrode 252 overlaps the second reflection layer 221 in plan view, the second reflection layer 221 can suitably suppress the incidence of the light LL on the second capacitance electrode 252.

2. Modification Examples

The embodiment described above may be modified in various manners. Aspects of specific modifications applicable to the above-described embodiment will be described below.

Figure 11:
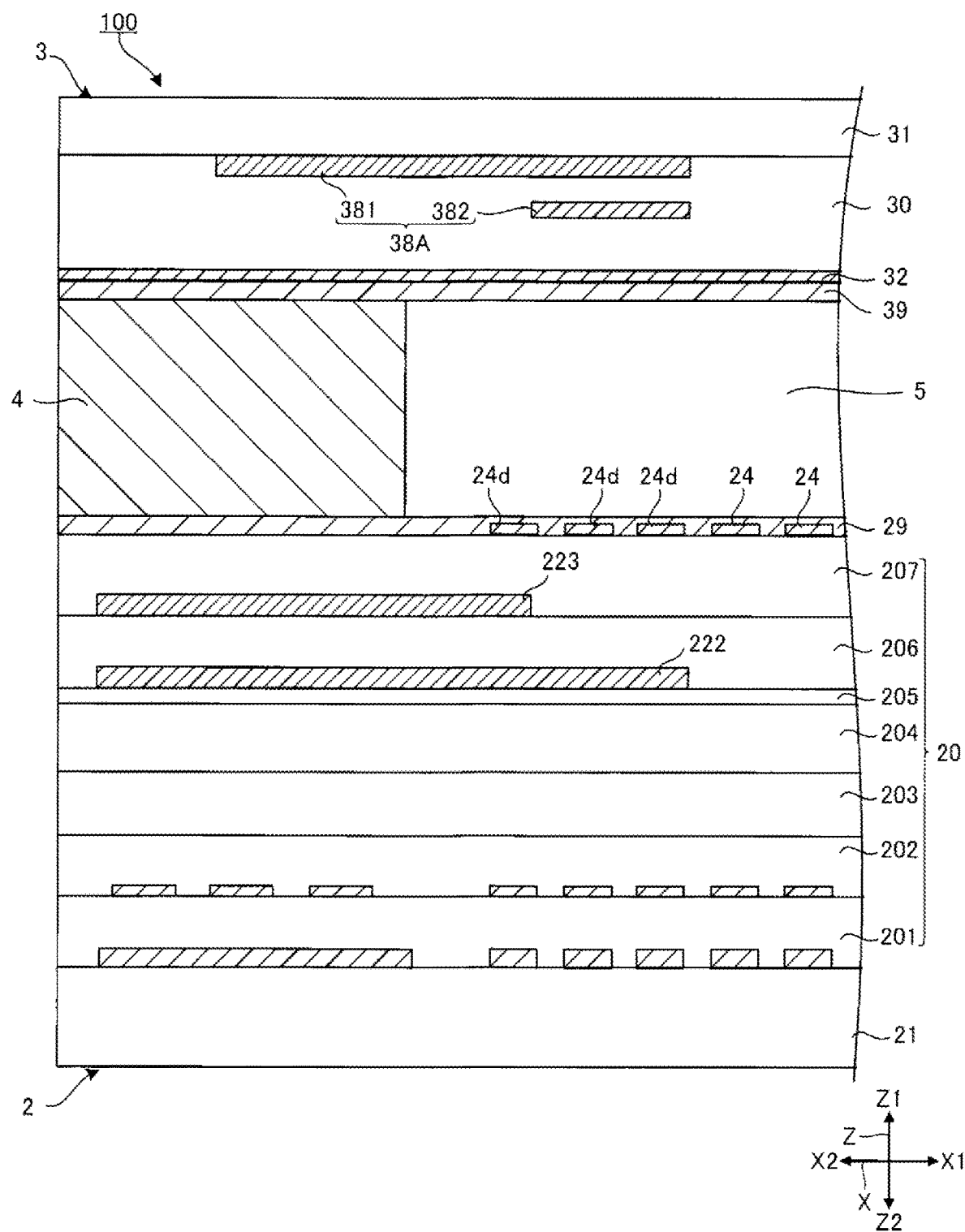
FIG. 11 is diagram illustrating a cross-sectional structure in a peripheral area of an electro-optical device of a modification example.

FIG. 11 is a diagram illustrating a cross-sectional structure of a peripheral area of an electro-optical device 100 of a modification example. As illustrated in FIG. 11, a reflection layer 381 and a light blocking layer 382 may not be in contact with each other. In the example illustrated in FIG. 11, the reflection layer 381 and the light blocking layer 382 are disposed at different insulating films of a plurality of insulating films included in a layered body 30. Thus, in order to form the light blocking layer 382, a light blocking film formed at the reflection layer 381 does not need to be patterned by etching. Thus, the light blocking layer 382 can be easily manufactured.

Further, in the embodiment described above, the reflection layer 223 is disposed closer to the incident side of the light LL than the light blocking layer 222 is to the incident side, but the light blocking layer 222 may be disposed closer to the incident side of the light LL than the reflection layer 223 is to the incident side. Even in this case, it is possible to suppress light leakage while suppressing the temperature rise of the first substrate 2. In addition, for example, return light can be reflected by the reflection layer 223, which thus can prevent the incidence of the light LL on the light blocking layer 222. Accordingly, the temperature rise of the first substrate 2 can be suppressed. Moreover, the reflection layer 223 and the light blocking layer 222 may be provided at the same layer.

Similarly, in the embodiment described above, the reflection layer 381 is disposed at an upper layer of the light blocking layer 382, but the light blocking layer 382 may be disposed closer to the incident side of the light LL than the reflection layer 381 is to the incident side. Even in this case, it is possible to suppress light leakage while suppressing the temperature rise of the first substrate 2 and the second substrate 3. In addition, for example, return light can be reflected by the reflection layer 381, which thus can prevent the incidence of the light LL on the light blocking layer 382. Accordingly, the temperature rise of the second substrate 3 can be suppressed. Moreover, the reflection layer 381 and the light blocking layer 382 may be provided at the same layer.

In the embodiment described above, the second capacitance electrode 252 has been described as an example of the "relay electrode", but the "relay electrode" may be other than the second capacitance electrode 252. That is, the "relay electrode" is not limited to an electrode included in the capacitance element 25. The arrangement of the various wiring lines illustrated in FIG. 9 is an example and may be other than the arrangement illustrated in FIG. 9. The "relay electrode" may be wired in any manner as long as it is coupled to the "pixel electrode" via the "contact plug".

The driving type of the "electro-optical device" is not limited to a vertical electric field type, and may be a horizontal electric field type. Note that examples of the horizontal electric field type include an in-plane switching (IPS) mode. Further, examples of the vertical electric field type include a twisted nematic (TN) mode, a vertical alignment (VA), a PVA mode, and an optically compensated bend (OCB) mode.

In each of the embodiments described above, the electro-optical device 100 of an active matrix type has been described as an example. However, the driving type of the electro-optical device 100 is not limited thereto, and may be a passive matrix type or the like.

Further, the liquid crystal display device has been described above as an example of the "electro-optical device". However, the "electro-optical device" is not limited thereto. For example, the "electro-optical device" may be applied to an image sensor or the like.

2. Electronic Apparatus

The electro-optical device 100 may be used for various electronic apparatuses.

Figure 12:
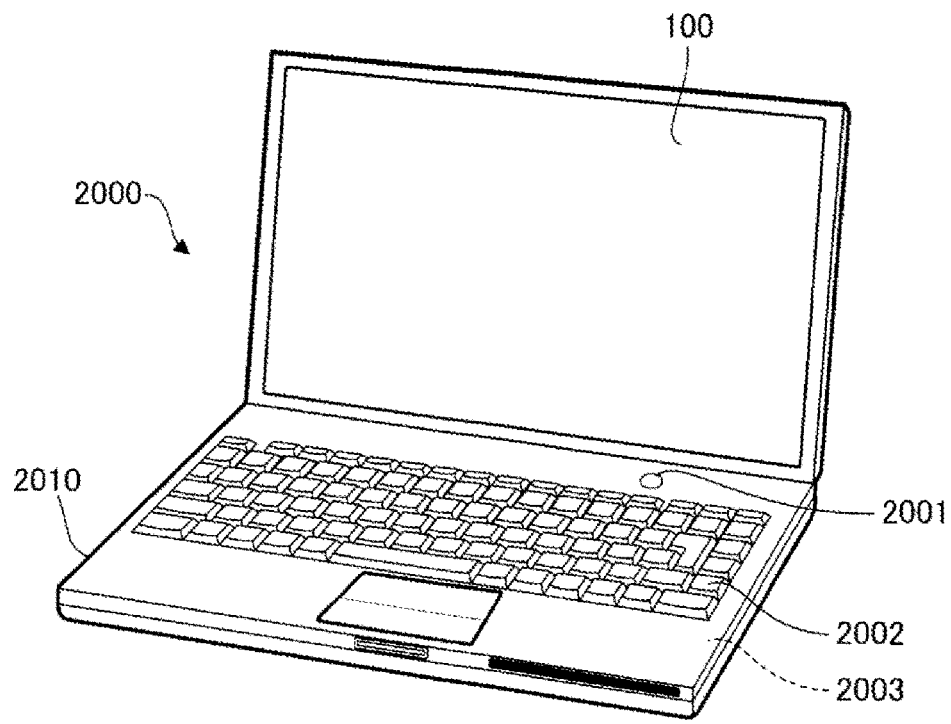
FIG. 12 is a perspective view illustrating a personal computer as an example of an electronic apparatus.

FIG. 12 is a perspective view illustrating a personal computer 2000 as an example of an electronic apparatus. The personal computer 2000 includes the electro-optical device 100 that displays various images, a main body portion 2010 provided with a power switch 2001 and a keyboard 2002, and a control unit 2003. The control unit 2003 includes a processor and a memory, and controls the operation of the electro-optical device 100, for example.

Figure 13:
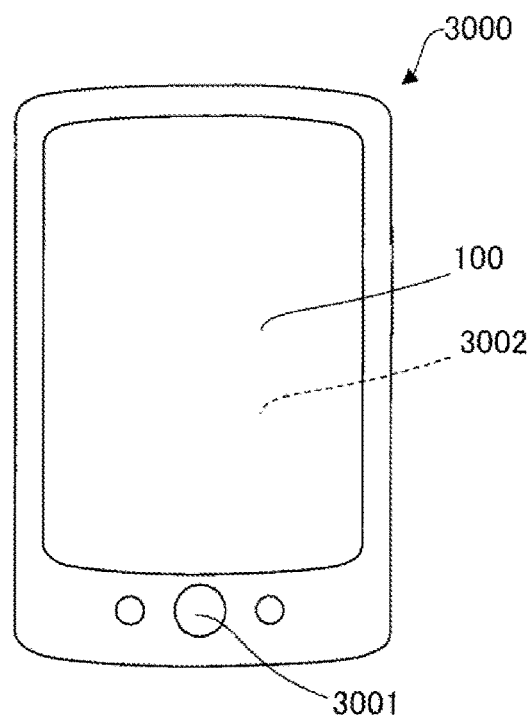
FIG. 13 is a plan view illustrating a smartphone as an example of the electronic apparatus.

FIG. 13 is a plan view illustrating a smartphone 3000 as an example of the electronic apparatus. The smartphone 3000 includes an operation button 3001, the electro-optical device 100 that displays various images, and a control unit 3002. The screen content displayed on the electro-optical device 100 is changed in accordance with the operation of the operation button 3001. The control unit 3002 includes a processor and a memory, and controls the operation of the electro-optical device 100, for example.

Figure 14:
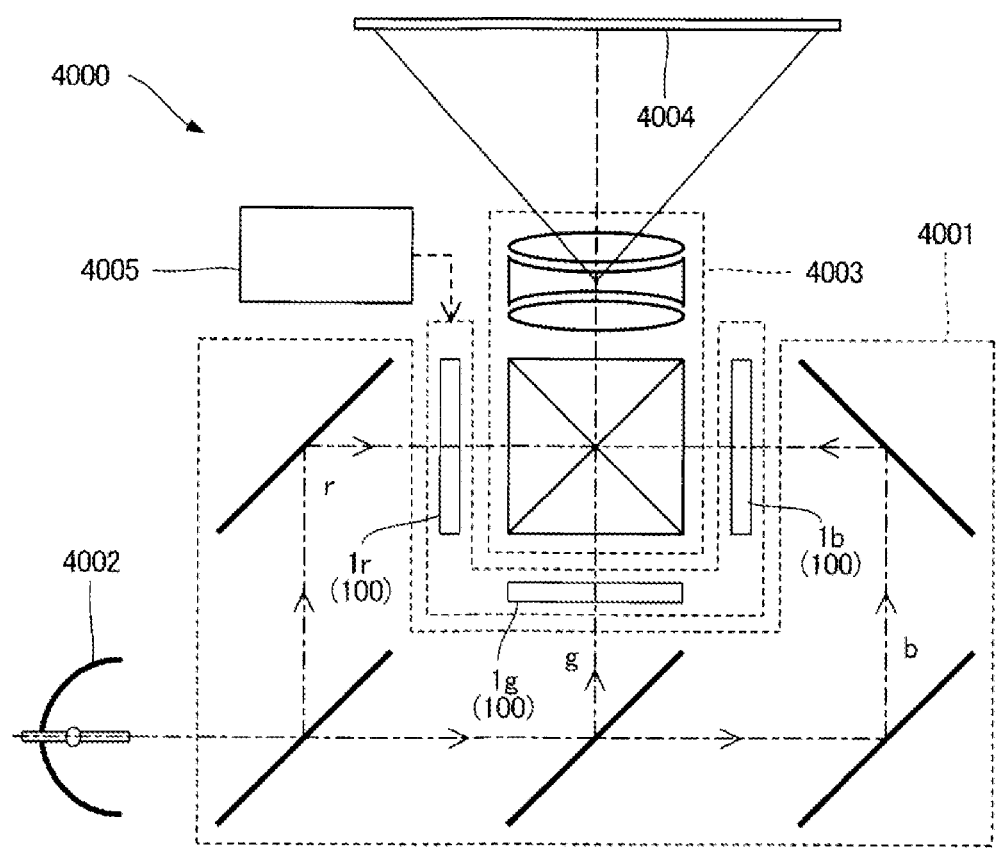
FIG. 14 is a schematic view illustrating a projector as an example of the electronic apparatus.

FIG. 14 is a schematic view illustrating a projector as an example of the electronic apparatus. A projection-type display device 4000 is a projector of a three-plate type, for example. An electro-optical device 1r is an electro-optical device 100 corresponding to a red display color, an electro-optical device 1g is an electro-optical device 100 corresponding to a green display color, and an electro-optical device 1b is an electro-optical device 100 corresponding to a blue display color. That is, the projection-type display device 4000 includes the three electro-optical devices 1r, 1g and 1b corresponding to the red, green, and blue display colors, respectively. A control unit 4005 includes a processor and a memory, and controls the operation of the electro-optical devices 100, for example.

Of light emitted from an illumination apparatus 4002 serving as a light source, an illumination optical system 4001 supplies a red component r to the electro-optical device 1r, a green component g to the electro-optical device 1g, and a blue component b to the electro-optical device 1b. Each of the electro-optical devices 1r, 1g and 1b functions as a light modulator such as a light valve that modulates corresponding monochromatic light supplied from the illumination optical system 4001 in accordance with the display image. A projection optical system 4003 combines the light emitted from the electro-optical devices 1r, 1g and 1b and projects the combined light to a projection surface 4004.

Each of the above-described electronic apparatuses includes the electro-optical device 100 described above, and the control units 2003, 3002, or 4005. The above-described electro-optical device 100 is excellent in quality reliability. Thus, with the electro-optical device 100 included, degradation of the display quality of the personal computer 2000, the smartphone 3000, or the projection-type display device 4000 can be suppressed.

Note that electronic apparatuses to which the electro-optical device of the present disclosure is applied are not limited to the apparatuses described as examples, and examples of the electronic apparatuses to which the electro-optical device of the present disclosure is applied include personal digital assistants (PDA), digital still cameras, televisions, video camcorders, car navigation systems, in-vehicle displays, electronic notebooks, electronic papers, calculators, word processors, workstations, television phones, and point-of-sale (POS) terminals. Further, examples of electronic apparatuses to which the present disclosure is applied include printers, scanners, copiers, video players, or apparatuses including a touch panel.

The present disclosure has been described above based on the preferred embodiment, but the present disclosure is not limited to the above-described embodiment. Further, the configuration of each part of the present disclosure may be replaced with any configuration that exhibits functions similar to those of the above-described embodiment, and any configuration may be added.

What is claimed is:

1. An electro-optical device comprising:
a display area configured to display an image; and
a peripheral area provided outside the display area in plan view, wherein
the electro-optical device includes
a first substrate,
a second substrate facing the first substrate, and
an electro-optical layer disposed between the first substrate and the second substrate and having an optical characteristic changing in accordance with an electric field,
at least one of the first substrate and the second substrate includes
a light blocking layer provided in the peripheral area and
a reflection layer provided in the peripheral area,
a reflectance of the reflection layer with respect to visible light is higher than a reflectance of the light blocking layer with respect to visible light,
the light blocking layer is disposed closer to the display area than the reflection layer is to the display area, and
a plane area of the light blocking layer is smaller than a plane area of the reflection layer, wherein
an outer edge of the light blocking layer and an outer edge of the reflection layer overlap each other in plan view, or
an inner edge of the light blocking layer and an inner edge of the reflection layer overlap each other in plan view.

2. The electro-optical device according to claim 1, wherein
the light blocking layer and the reflection layer are provided at different layers.

3. The electro-optical device according to claim 1, wherein
the light blocking layer and the reflection layer are in contact with each other.

4. The electro-optical device according to claim 1, wherein
the reflection layer includes aluminum, and
the light blocking layer includes titanium nitride, tungsten, or tungsten silicide.

5. The electro-optical device according to claim 1, wherein
the first substrate further includes
a plurality of pixel electrodes provided in the display area, and
a plurality of dummy pixel electrodes provided in the peripheral area and located outside the plurality of pixel electrodes, and
the light blocking layer includes a part overlapping some or all of the plurality of dummy pixel electrodes in plan view.

6. The electro-optical device according to claim 1, wherein
the first substrate includes
a transistor provided in the display area,
a pixel electrode provided corresponding to the transistor,
a relay electrode disposed at a layer between the transistor and the pixel electrode,
a contact plug provided inside a through hole extending through a layer between the relay electrode and the pixel electrode, the contact plug being configured to electrically couple the relay electrode and the pixel electrode, and
a second reflection layer disposed at a layer between the relay electrode and the pixel electrode.

7. The electro-optical device according to claim 6, wherein
the reflection layer is a first reflection layer,
the first substrate includes the first reflection layer, and
the first reflection layer is disposed at the same layer as the second reflection layer.

8. An electronic apparatus comprising:
the electro-optical device according to claim 1; and
a control unit configured to control an operation of the electro-optical device.

9. An electro-optical device comprising:
a display area configured to display an image; and
a peripheral area provided outside the display area in plan view, wherein
the electro-optical device includes
a first substrate,
a second substrate facing the first substrate, and
an electro-optical layer disposed between the first substrate and the second substrate and having an optical characteristic changing in accordance with an electric field,
at least one of the first substrate and the second substrate includes
a light blocking layer provided in the peripheral area and
a reflection layer provided in the peripheral area,
a reflectance of the reflection layer with respect to visible light is higher than a reflectance of the light blocking layer with respect to visible light,
the light blocking layer is disposed closer to the display area than the reflection layer is to the display area, and
a plane area of the light blocking layer is smaller than a plane area of the reflection layer, wherein
each of the first substrate and the second substrate includes the reflection layer and the light blocking layer.

10. The electro-optical device according to claim 9, wherein
the light blocking layer provided at the first substrate includes a part located closer to the display area than the reflection layer provided at the second substrate is to the display area.

11. An electro-optical device comprising:
a display area configured to display an image; and
a peripheral area provided outside the display area in plan view; and
a transistor provided in the peripheral area, wherein
the electro-optical device includes
a first substrate,
a second substrate facing the first substrate, and
an electro-optical layer disposed between the first substrate and the second substrate and having an optical characteristic changing in accordance with an electric field,
at least one of the first substrate and the second substrate includes
a light blocking layer provided in the peripheral area and
a reflection layer provided in the peripheral area,
a reflectance of the reflection layer with respect to visible light is higher than a reflectance of the light blocking layer with respect to visible light,
the light blocking layer is disposed closer to the display area than the reflection layer is to the display area,
a plane area of the light blocking layer is smaller than a plane area of the reflection layer, and
the reflection layer is disposed closer to an incident side of light than the light blocking layer in the peripheral area is to the incident side and overlaps the transistor in plan view.

* * * * *